US010462848B2

(12) United States Patent
Yamamura

(10) Patent No.: US 10,462,848 B2
(45) Date of Patent: Oct. 29, 2019

(54) NON-TRANSITORY COMPUTER READABLE RECORDING MEDIUM, COMMUNICATION METHOD AND COMMUNICATION DEVICE

(71) Applicant: FUJITSU LIMITED, Kawasaki-shi, Kanagawa (JP)

(72) Inventor: Shinya Yamamura, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 276 days.

(21) Appl. No.: 15/470,150

(22) Filed: Mar. 27, 2017

(65) Prior Publication Data
US 2017/0289023 A1 Oct. 5, 2017

(30) Foreign Application Priority Data
Mar. 31, 2016 (JP) .................................. 2016-072321

(51) Int. Cl.
| | | |
|---|---|---|
| *G06F 15/16* | (2006.01) | |
| *H04W 92/18* | (2009.01) | |
| *H04L 29/08* | (2006.01) | |
| *H04L 12/26* | (2006.01) | |

(Continued)

(52) U.S. Cl.
CPC ......... *H04W 92/18* (2013.01); *H04L 12/6418* (2013.01); *H04L 43/0805* (2013.01); *H04L 43/0847* (2013.01); *H04L 43/0852* (2013.01); *H04L 67/04* (2013.01); *H04L 69/14* (2013.01); *H04L 69/16* (2013.01); *H04L 43/045* (2013.01)

(58) Field of Classification Search
CPC ............. H04L 12/6418; H04L 43/0805; H04L 43/0847; H04L 43/0852; H04L 43/045; H04L 67/04; H04L 69/14; H04L 69/16; H04W 92/18; H04W 4/02; H04W 8/245; H04W 88/04

USPC ......................................................... 709/232
See application file for complete search history.

(56) References Cited

U.S. PATENT DOCUMENTS 9,419,920 B1 * 8/2016 Rohrer .................. H04L 49/355
2003/0187631 A1 * 10/2003 Masushige .......... H04L 63/0281
703/27

(Continued)

FOREIGN PATENT DOCUMENTS

JP 2015-528222 9/2015

OTHER PUBLICATIONS

Scott et al., "Bundle Protocol Specification, IETF RFC 5050, Experimental," Nov. 2007 (Year: 2007).*

*Primary Examiner* — Wing F Chan
*Assistant Examiner* — Joseph R Maniwang
(74) *Attorney, Agent, or Firm* — Staas & Halsey LLP

(57) ABSTRACT

A non-transitory computer readable recording medium storing therein a communication program, the communication program relaying communication from an application operating on a terminal to a communication destination and causing a computer to execute a process, the process including: switching a communication protocol for the communication from a first protocol to a Delay/Disruption Tolerant Networking (DTN) protocol, in accordance with a connection condition with the communication destination for the communication; and notifying the terminal of a failure of a specific communication in cases when the specific communication has been notified to the application as completed and the specific communication in the DTN protocol results in failure.

9 Claims, 23 Drawing Sheets

(51) Int. Cl.
*H04L 29/06* (2006.01)
*H04L 12/64* (2006.01)

(56) References Cited

U.S. PATENT DOCUMENTS

2010/0074194 A1* 3/2010 Liu .................. H04L 45/124
                                                          370/329
2015/0156122 A1   6/2015 Singh et al.

* cited by examiner

FIG. 4A

PRIMARY BUNDLE BLOCK

| 8bit | 16bit | 24bit | 32bit |
|---|---|---|---|
| Version | Proc. Flags | | |
| Block length | | | |
| Destination scheme offset | | Destination SSP offset | |
| Source scheme offset | | Source SSP offset | |
| Report-to scheme offset | | Report-to SSP offset | |
| Custodian scheme offset | | Custodian SSP offset | |
| Creation Timestamp time | | | |
| Creation Timestamp sequence number | | | |
| Lifetime | | | |
| Dictionary length | | | |
| Dictionary byte array | | | |
| [Fragment offset] | | | |
| [Total application data unit length] | | | |

FIG. 4B

BUNDLE PAYLOAD BLOCK

| 8bit | 16bit | 24bit | 32bit |
|---|---|---|---|
| Block type | Proc. Flags | Block length | |
| Bundle Payload | | | |

FIG. 5A

CONNECTION LIST — 116, 216

| CONNECTION NUMBER | SOCKET CHANNEL ID | DESTINATION EID |
|---|---|---|
| ..... | ..... | ..... |

FIG. 5B

FILTER TABLE — 118, 128

| FILTER CONDITION | CONVERSION INFORMATION | SETTING STATE |
|---|---|---|
| ..... | ..... | ..... |

FIG. 5C

BUNDLE BUFFER — 122, 222

| BUNDLE ID | BUNDLE |
|---|---|
| ..... | ..... |

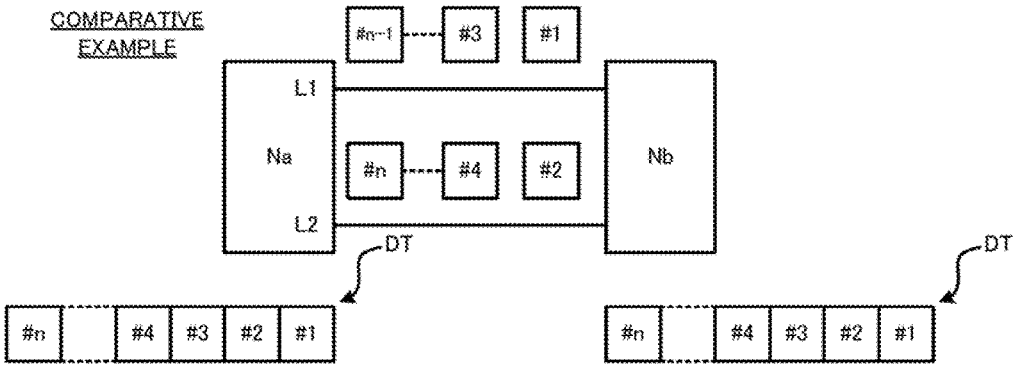
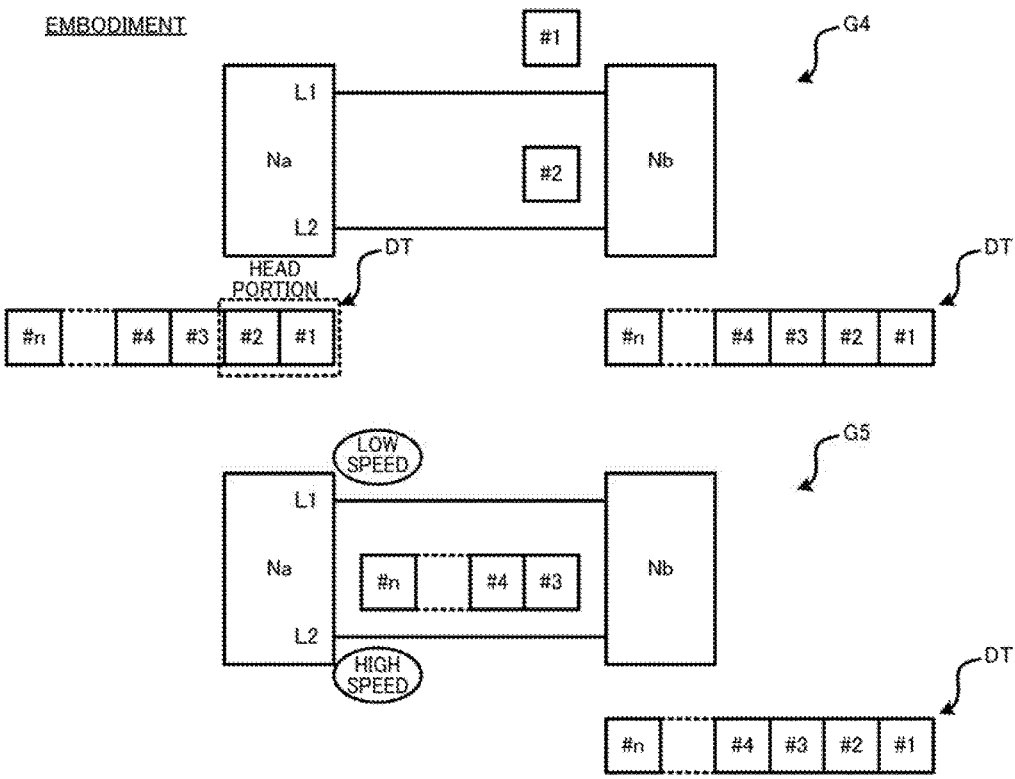

FIG. 14A

INITIAL SETTING FILE OF APL CLIENT — 117

| EID OF APL CLIENT | dtn://node1 |
|---|---|
| OUTPUT POINTER | /data/receive |
| PORT NUMBER OF APL CLIENT | 8001 |
| DESTINATION EID | dtn://dtnserver |
| PORT NUMBER OF APL SERVER | 40000 |
| IP ADDRESS OF APL SERVER | 10.10.30.1 |

FIG. 14B

ROUTE TBL OF APL CLIENT — 123

| DESTINATION EID | DESTINATION IP ADDRESS | PORT NUMBER |
|---|---|---|
| dtn://dtnserver | 10.10.20.1 | 4556 |

FIG. 14C

INITIAL SETTING FILE OF APL SERVER — 217

| EID OF DTN SERVER | dtn://dtnserver |
|---|---|
| OUTPUT POINTER | /data/receive |
| PORT NUMBER OF APL SERVER | 40000 |
| IP ADDRESS OF APL SERVER | 10.10.30.1 |

FIG. 14D

ROUTE TBL OF APL SERVER — 223

| DESTINATION EID | DESTINATION IP ADDRESS | PORT NUMBER |
|---|---|---|
| dtn://node1 | 10.10.10.1 | 4556 |

FIG. 21A

INITIAL SETTING FILE OF APL CLIENT — 117

| EID OF APL CLIENT | dtn://node1/web |
|---|---|
| OUTPUT POINTER | /data/receive/web |
| PORT NUMBER OF APL CLIENT | 8002 |
| DESTINATION EID | dtn://dtnserver/web |
| PORT NUMBER OF WEB PROXY SERVER | 8080 |
| IP ADDRESS OF WEB PROXY SERVER | 10.10.40.1 |

FIG. 21B

ROUTE TBL OF APL CLIENT — 123

| DESTINATION EID | DESTINATION IP ADDRESS | PORT NUMBER |
|---|---|---|
| dtn://dtnserver/web | 10.10.20.1 | 4556 |

FIG. 21C

INITIAL SETTING FILE OF APL SERVER — 217

| EID OF DTN SERVER | dtn://dtnserver/web |
|---|---|
| OUTPUT POINTER | /data/receive |
| PORT NUMBER OF WEB PROXY SERVER | 8080 |
| IP ADDRESS OF WEB PROXY SERVER | 10.10.40.1 |

FIG. 21D

ROUTE TBL OF APL SERVER — 223

| DESTINATION EID | DESTINATION IP ADDRESS | PORT NUMBER |
|---|---|---|
| dtn://node1/web | 10.10.10.1 | 4556 |

NON-TRANSITORY COMPUTER READABLE RECORDING MEDIUM, COMMUNICATION METHOD AND COMMUNICATION DEVICE

CROSS-REFERENCE TO RELATED APPLICATION

This application is based upon and claims the benefit of priority of the prior Japanese Patent Application No. 2016-072321, filed on Mar. 31, 2016, the entire contents of which are incorporated herein by reference.

FIELD

A certain aspect of embodiments described herein relates to a non-transitory computer readable recording medium, a communication method and a communication device.

BACKGROUND

Recently, as a result that wireless access points (hereinafter referred to as "AP") have been spread, it is natural that the terminals such as smartphones communicate with the other parties while changing the wireless APs and wide area wireless connection of a communication carrier. In such an environment, a communication condition is influenced by the connection number of terminals using a same wireless medium and a neighboring radio wave circumstance, so that a communication quality varies according to a place and time, and the communication becomes intermittent.

For example, when a user's terminal communicates with a server on the internet while changing an AP to be linked during the movement, if there is a large amount of data of the communication and a staying time of the terminal within a link available range of the AP is short, the communication during the connection is disconnected on the way and hence retrial of the communication is needed after re-link with another AP.

In contrast, it is considered to provide an application of the terminal with a resistance to delay and disruption of the communication (see e.g. Patent Document 1: Japanese National Publication of International Patent Application No. 2015-528222). There is known a Delay/Disruption Tolerant Networking (DTN) as a technique enabling smooth communication in the environment where the communication becomes intermittent. The standardization of this technique is promoted by IETF (The Internet Engineering Task Force), and a bundle protocol to be applied to the DTN is specified in RFC (Request For Comments) 5050, for example.

SUMMARY

According to an aspect of the present invention, there is provided a non-transitory computer readable recording medium storing therein a communication program, the communication program relaying communication from an application operating on a terminal to a communication destination and causing a computer to execute a process, the process including: switching a communication protocol for the communication from a first protocol to a Delay/Disruption Tolerant Networking (DTN) protocol in accordance with a connection condition with the communication destination for the communication; and notifying the terminal of a failure of a specific communication in cases when the specific communication has been notified to the application as completed and the specific communication in the DTN protocol results in failure.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4A is a diagram illustrating a format of a primary bundle block included in a bundle;

FIG. 4B is a diagram illustrating a format of a bundle payload block included in the bundle;

FIG. 5A is a diagram illustrating an example of a connection list;

FIG. 5B is a diagram illustrating an example of a filter table;

FIG. 5C is a diagram illustrating an example of a bundle buffer;

FIG. 11A is a diagram illustrating a bundle communication using a plurality of communication lines according to a comparative example;

FIG. 11B is a diagram illustrating the bundle communication using the plurality of communication lines according to an embodiment;

FIGS. 14A and 14C are diagrams illustrating initial setting files of a communication operation example 1;

FIGS. 14B and 14D are diagrams illustrating route tables of the communication operation example 1;

FIGS. 21A and 21C are diagrams illustrating initial setting files of a communication operation example 2;

FIGS. 21B and 21D are diagrams illustrating route tables of the communication operation example 2;

DESCRIPTION OF EMBODIMENTS

The bundle protocol is assumed to be applied to the communication having no real time as premises for the delay, like a communication under a special environment such as an outer space and an ocean essentially. Therefore, it is difficult to directly use the bundle protocol for a general application. Accordingly, to use the bundle protocol in the communication of the general application, it is considered to use a proxy function communicating based on the bundle protocol.

However, when the proxy function is used, even if the data transmission fails on the bundle protocol, the proxy function causes the application to recognize the failure of the data transmission as having succeeded in communication, and hence it is difficult for the user to grasp a communication result. Moreover, since a timer expiration time for judging the communication propriety is longer than other protocols in the bundle protocol, it is difficult to use a normal error detection means.

Figure 1:
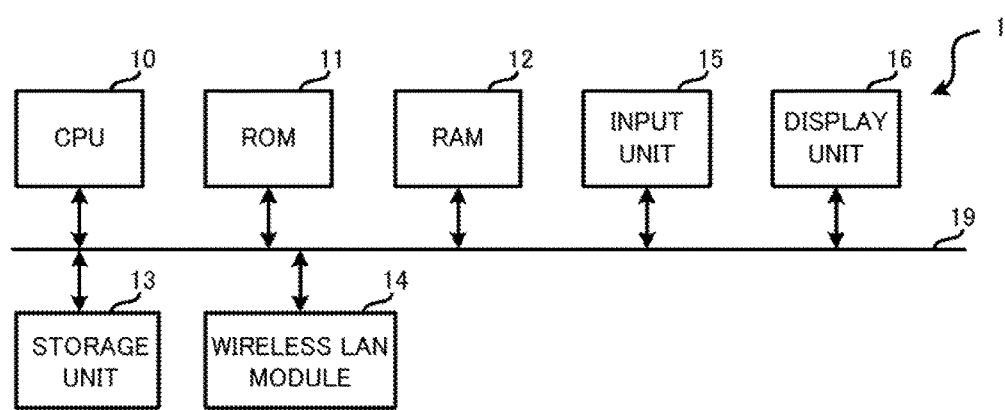
FIG. 1 is a block diagram illustrating an example of a terminal.

FIG. 1 is a block diagram illustrating an example of a terminal. A communication device such as a smartphone and a personal computer is referred to as a terminal 1, for example, but the terminal 1 is not limited to this.

The terminal 1 includes a CPU (Central Processing Unit) 10, a ROM (Read Only Memory) 11, a RAM (Random Access Memory) 12, a storage unit 13 such as a HDD (Hard Disk Drive) and a memory, a wireless LAN (Local Area Network) module 14, an input unit 15, and a display unit 16. The CPU 10 is connected to the ROM 11, the RAM 12, the storage unit 13, the wireless LAN module 14, the input unit 15 and the display unit 16 via a bus 19 so as to be capable of inputting and outputting signals each other.

A program for driving the CPU 10 is stored into the ROM 11. A communication program executing a communication method of the embodiment is included in programs in the ROM 11.

The RAM 12 functions as a working memory of the CPU 10. Various information that is used for the execution of the program is stored into the storage unit 13. The wireless LAN module 14 communicates with a server on an internet by performing link-up with an AP (Access Point) connected to an access system network, for example. The wireless LAN module 14 can perform the link-up with the AP by using a plurality of communication lines.

The input unit 15 inputs information to the terminal 1. A keyboard, a mouse, a touch panel or the like is referred to as the input unit 15, for example. The input unit 15 outputs input information to the CPU 10 via the bus 19.

The display unit 16 outputs information of the terminal 1. A display, a touch panel, a printer or the like is referred to as the display unit 16, for example. The display unit 16 acquires information from the CPU 10 via the bus 19 to display the acquired information. A status and a result of the communication of a client application in the terminal 1 described later are displayed on the display unit 16.

When the CPU 10 reads the program from the ROM 11, various functions for executing the communication method are formed. The CPU 10 is an example of a computer executing the program. Here, a functional configuration of the terminal 1 is described later.

Figure 2:
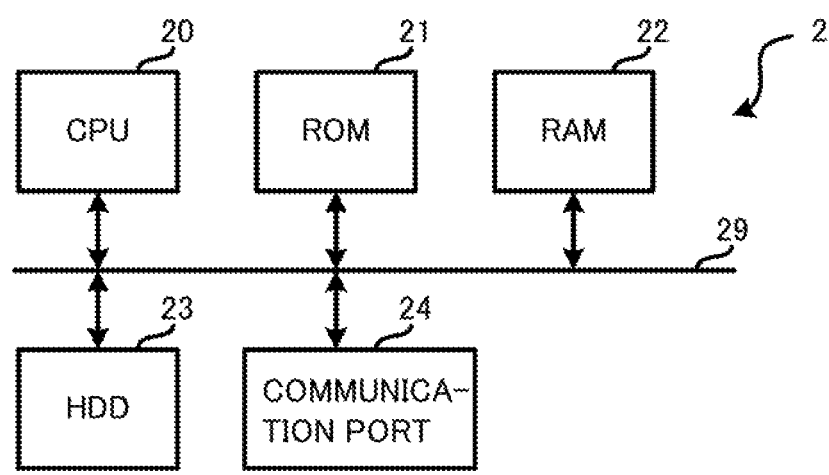
FIG. 2 is a block diagram illustrating an example of a server.

FIG. 2 is a block diagram illustrating an example of a server 2. The server 2 is a communication device that is connected to the internet, and provides a predetermined service by communicating with the terminal 1, for example.

The server 2 includes a CPU 20, a ROM 21, a RAM 22, a HDD 23 and a communication port 24. The CPU 20 is connected to the ROM 21, the RAM 22, the HDD 23 and the communication port 24 via a bus 29 so as to be capable of inputting and outputting signals each other.

A program for driving the CPU 20 is stored into the ROM 21. The RAM 22 functions as a working memory of the CPU 20. The communication port 24 is a NIC (Network Interface Card), for example, and communicates with the terminal 1 via the internet.

When the CPU 20 reads the program from the ROM 21, various functions are formed.

Figure 3:
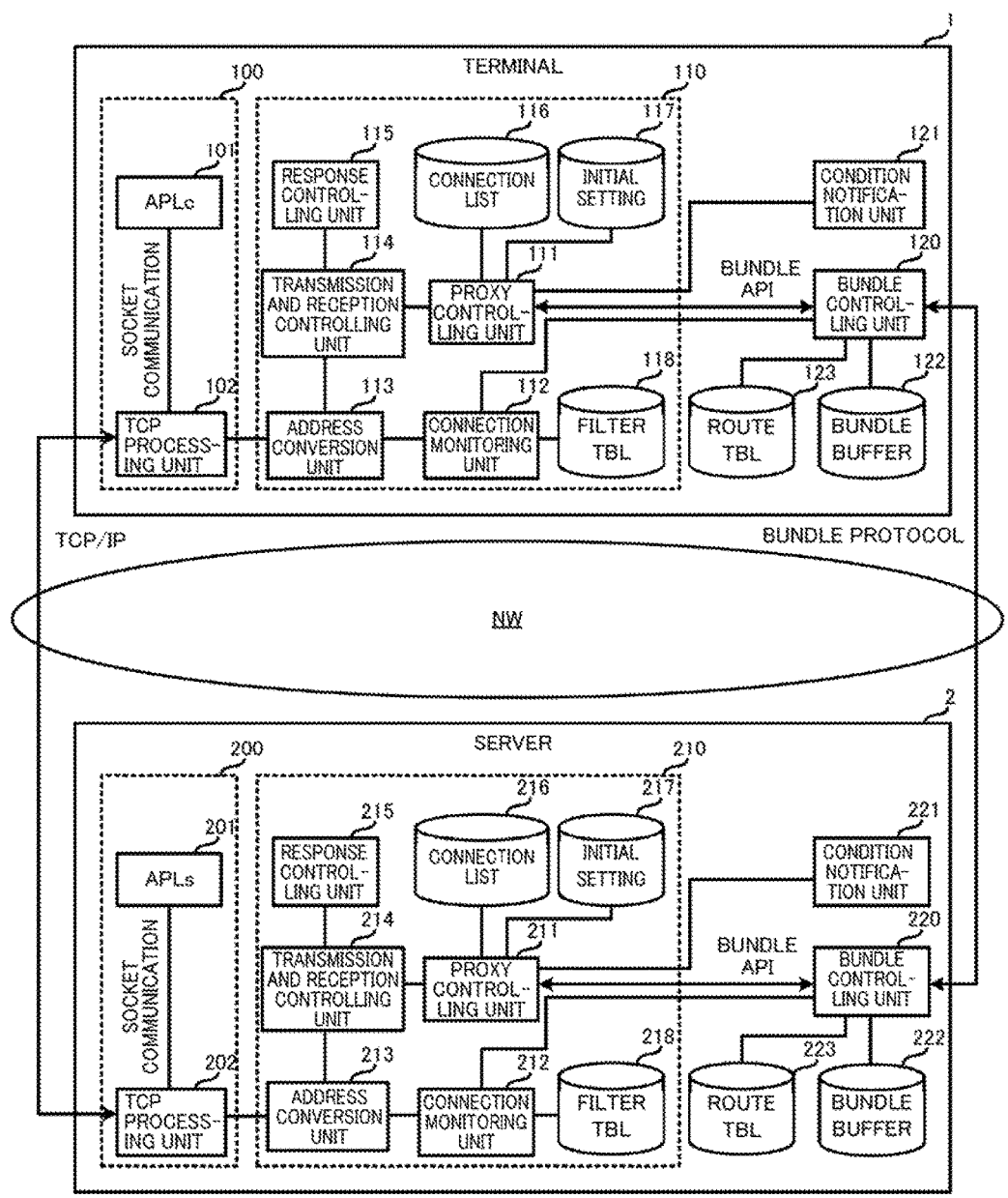
FIG. 3 is a block diagram illustrating an example of each functional configuration of the terminal and the server.

FIG. 3 is a block diagram illustrating an example of each functional configuration of the terminal 1 and the server 2. The terminal 1 and the server 2 are connected to each other via a network NW.

The terminal 1 includes an application function unit 100, a proxy protocol function unit 110, a bundle controlling unit 120, a condition notification unit 121, a bundle buffer 122, and a route table (route TBL) 123.

The application function unit 100 includes a client application (ARLc) 101 and a TCP (Transmission Control Protocol) processing unit 102. The proxy protocol function unit 110 includes a proxy controlling unit 111, a connection monitoring unit 112, an address conversion unit 113, a transmission and reception controlling unit 114, a response controlling unit 115, a connection list 116, an initial setting file 117, and a filter table (filter TBL) 118.

The client application 101, the TCP processing unit 102, the proxy controlling unit 111, the connection monitoring unit 112, the address conversion unit 113, the transmission and reception controlling unit 114, the response controlling unit 115, the bundle controlling unit 120 and the condition notification unit 121 are functions formed in the CPU 10 of the terminal 1. Then, the connection list 116, the initial setting file 117, the filter TBL 118, the bundle buffer 122 and the route TBL 123 are stored into the storage unit 13.

Parts other than the application function unit 100 in the functional configuration of the terminal 1 illustrated in FIG. 3 serve as a communication device and a communication program of the embodiment, and relay communication from the client application 101 to a communication destination. The communication device and the communication program of the embodiment may be provided inside the terminal 1 as illustrated in FIG. 3, but may be provided in a device other than the terminal 1.

On the other hand, the server 2 includes an application function unit 200, a proxy protocol function unit 210, a bundle controlling unit 220, a condition notification unit 221, a bundle buffer 222 and a route TBL 223.

The application function unit 200 includes a server application (ARLs) 201 and a TCP (Transmission Control Protocol) processing unit 202. The proxy protocol function unit 210 includes a proxy controlling unit 211, a connection monitoring unit 212, an address conversion unit 213, a transmission and reception controlling unit 214, a response controlling unit 215, a connection list 216, an initial setting file 217, and a filter TBL 218.

The server application 201, the TCP processing unit 202, the proxy controlling unit 211, the connection monitoring unit 212, the address conversion unit 213, the transmission and reception controlling unit 214, the response controlling unit 215, the bundle controlling unit 220 and the condition notification unit 221 are functions formed in the CPU 20 of the server 2. Then, the connection list 216, the initial setting file 217, the filter TBL 218, the bundle buffer 222 and the route TBL 223 are stored into the HDD 23.

The server application 201 and the client application 101 cooperate and offer predetermined functions by communicating by the TCP processing units 102 and 202. A file transfer function, a web browser function and so on are referred to as the functions of the server application 201 and the client application 101, but the functions of the server application 201 and the client application 101 are not limited to the above-mentioned functions. Here, the client application 101 is an example of an application executed in the terminal 1.

Each of the TCP processing units 102 and 202 includes a communication function of a TCP/IP (Internet Protocol) that is offered by a driver of an OS (Operating System), for example. The TCP processing unit 102 of the terminal 1 controls the wireless LAN module 14 to transmit and receive packets. The TCP processing unit 202 of the server 2 controls the communication port 24 to transmit and receive packets. Here, the TCP/IP is an example of a first protocol.

The server application 201 and the client application 101 directly perform communication based on the TCP/IP via the network NW. However, in an environment where the communication becomes intermittent, the bundle controlling units 120 and 220 perform communication based on a bundle protocol of DTN (Delay/Disruption Tolerant Networking) as substitute for communication based on the TCP/IP.

The bundle controlling unit 120 switches a communication protocol between the client application 101 and the communication destination from the TCP/IP to the bundle protocol of the DTN in accordance with a connection condition with the communication destination. At this time, the connection monitoring unit 112 monitors the connection condition with the communication destination, and controls the address conversion unit 113 in accordance with the connection condition.

Thereby, the connection monitoring unit 112 switches the communication protocol of the client application 101 with the communication destination from the TCP/IP to the bundle protocol of the DTN, as an example of a switch processor. Therefore, the communication protocol of the client application 101 is switched from the TCP/IP by the TCP processing unit 102 to the bundle protocol by the bundle controlling unit 120.

Moreover, the bundle controlling unit 220 switches the communication protocol between the server application 201 and the communication destination from the TCP/IP to the bundle protocol of the DTN in accordance with the connection condition with the communication destination. At this time, the connection monitoring unit 212 monitors the connection condition with the communication destination, and controls the address conversion unit 213 in accordance with the connection condition.

Thereby, the connection monitoring unit 212 switches the communication protocol of the server application 201 with the communication destination from the TCP/IP to the bundle protocol of the DTN. Therefore, the communication protocol of the server application 201 is switched from the TCP/IP by the TCP processing unit 202 to the bundle protocol by the bundle controlling unit 220.

The bundle controlling units 120 and 220 perform the communication based on the bundle protocol according to a rule of RFC5050, for example. The bundle controlling units 120 and 220 accommodate transmission object data of the client application 101 and the server application 201 into a payload part of a data message called a bundle to transmit the data message. Here, the bundle controlling unit 120 is an example of a communication unit that communicates with the communication destination by the bundle protocol.

FIG. 4A illustrates a format of a primary bundle block included in the bundle, and FIG. 4B illustrates a format of a bundle payload block included in the bundle. The bundle includes the primary bundle block and the bundle payload block. Included in the primary bundle block are information on a transmission source and a destination, a life time ("Lifetime") indicating a time before the deletion of the bundle and so on. A payload ("Bundle Payload") accommodating data is included in the bundle payload block. Each field in the bundle is defined in the RFC5050.

When each of the bundle controlling units 120 and 220 transmits the bundle, each of the bundle controlling units 120 and 220 acquires a destination IP address on the TCP/IP corresponding to an EID (Endpoint ID) indicating a destination in the bundle protocol, and a TCP port number (hereinafter referred to as "a port number") with reference to the corresponding route TBL 123 or 223. When the connection with the destination, i.e., the connection between the terminal 1 and the server 2 is disconnected, each of the bundle controlling units 120 and 220 stores the bundle into the corresponding bundle buffer 122 or 222. When the disconnected connection is reconnected, each of the bundle controlling units 120 and 220 reads the bundle from the bundle buffer 122 or 222 to transmit the bundle to the destination. Thereby, the communication based on the DTN is performed. In the case of the terminal 1, the bundle controlling unit 120 transmits and receives the bundle by controlling the wireless LAN module 14. In the case of the server 2, the bundle controlling unit 220 transmits and receives the bundle by controlling the communication port 24.

FIG. 5C illustrates an example of the bundle buffers 122 and 222. The bundle buffers 122 and 222 are storage domains of the bundle. The bundle is stored into the bundle buffer 122 or 222 along with a bundle ID identifying the bundle. Each of the bundle controlling units 120 and 220 stores the bundle into the corresponding bundle buffer 122 or 222 at the time of not only the transmission but also the reception of the bundle.

Referring to FIG. 3 again, each of the proxy protocol function units 110 and 210 converts the communication of the client application 101 and the server application 201 from the communication of the TCP to the communication of the bundle protocol. At this time, each of the proxy protocol function units 110 and 210 performs setting and control to the corresponding bundle controlling unit 120 or 220 by a bundle API (Application Programing Interface), so that even a general application can use the DTN. Hereinafter, a description will be given of the proxy protocol function units 110 and 210 in detail.

The address conversion units 113 and 213 convert the destinations of the communication of the client application 101 and the server application 201 into the destinations of the transmission and reception controlling units 114 and 214, respectively. For example, in the terminal 1, the address conversion unit 113 converts the destination IP address and the port number of the packet to be transmitted to the server 2 into the destination IP address and the port number of a TCP socket (hereinafter referred to as "a socket") set in the transmission and reception controlling unit 114.

Therefore, the proxy protocol function units 110 and 210 can receive the packet transmitted from the client application 101 and the server application 201 to the communication destination, respectively. For example, when Windows is used as the OS, the address conversion units 113 and 213 are realized by a WFP (Windows Filtering Platform). When Linux is used as the OS, the address conversion units 113 and 213 are realized by "iptables".

Each of the transmission and reception controlling units 114 and 214 terminates socket communication of the TCP of the client application 101 and the server application 201. Each of the transmission and reception controlling units 114 and 214 establishes local loop-back connection in the device.

The transmission and reception controlling unit 114 monitors connection of the socket from the client application 101, establishes the socket for the server application 201 in accordance with an instruction from the proxy controlling unit 111, and transmits data to the instructed socket.

The transmission and reception controlling units 114 and 214 divide the packet received from the client application 101 and the server application 201 through the socket into a designated size in accordance with a policy (an algorithm, a processing policy) set by a user or an operator, and output divided data to the proxy controlling units 111 and 211, respectively. A division size is a size of data received from the open of the socket to the close thereof, a received size of the packet, or a predetermined value, for example.

The proxy controlling units 111 and 211 accommodate data of the packet received by the transmission and reception controlling units 114 and 214 into the payload of a proxy message, and output the proxy message to the bundle controlling units 120 and 220 by the bundle API, respectively. Thereby, the proxy controlling units 111 and 211 request the transmission of the bundle to the bundle controlling units 120 and 220, respectively.

Each of the proxy controlling units 111 and 211 manages the proxy message according to a connection number corresponding to the destination. Whenever the socket is opened by the transmission and reception controlling units 114 and 214, the proxy controlling units 111 and 211 register a new connection number into the connection lists 116 and 216, respectively.

FIG. 5A illustrates an example of the connection lists 116 and 216. The connection number, a socket channel ID and a destination EID are associated with each other and registered into the connection lists 116 and 216. The socket channel ID is an identifier of the socket of the transmission and reception controlling units 114 and 214.

The proxy controlling units 111 and 211 add the connection number corresponding to the socket channel ID of the socket in a reception source of the packet to the proxy message, and output the proxy message with the connection number to the bundle controlling units 120 and 220, respectively. The proxy controlling units 111 and 211 request the transmission of the bundle for the corresponding destination EID to the bundle controlling units 120 and 220, respectively. Therefore, the EID of the server 2 is registered into the destination EID of the connection list 116 of the terminal 1, and the EID of the terminal 1 is registered into the destination EID of the connection list 216 of the server 2. The proxy controlling units 111 and 211 acquire information necessary for the communication such as the EID of its own device and the EID of the communication destination by reading the initial setting files 117 and 217, respectively.

The proxy controlling units 111 and 211 receive the proxy message from the bundle controlling units 120 and 220, respectively. When the connection number of the received proxy message is not registered into the connection lists 116 and 216, the proxy controlling units 111 and 211 instruct the transmission and reception controlling units 114 and 214 to open the new socket, and begin the communication with the use of the new socket, respectively.

When data is not accommodated into the received proxy message, the proxy controlling units 111 and 211 search the socket channel ID corresponding to the connection number from the connection lists 116 and 216, respectively. The proxy controlling units 111 and 211 instruct the transmission and reception controlling units 114 and 214 to delete the socket corresponding to the searched socket channel ID, respectively.

Thus, the socket and the EID are associated with each other and managed by the connection lists 116 and 126. Therefore, the communication of the TCP/IP using the socket can be performed based on the bundle protocol.

The bundle controlling units 120 and 220 transmit the bundle in accordance with a transmission request of the bundle from the proxy controlling units 111 and 211, respectively. Therefore, the bundle controlling units 120 and 220 can perform the communication from the client application 101 and the server application 201 to the communication destination based on a protocol of the DTN.

When the communication from the client application 101 and the server application 201 requests a response, the response controlling units 115 and 215 generate the response to output the response to the client application 101 and the server application 201, respectively. Therefore, even when the communication with the communication destination is disrupted due to the disconnection of the connection, the client application 101 and the server application 201 operate without knowing the disruption of the communication. Accordingly, the retrial of the communication is not needed after reconnection of the connection.

For example, in the terminal 1, when the proxy controlling unit 111 performs the communication of the client application 101, the response controlling unit 115 outputs the response to the communication to the client application 101. When a file is divided and divided file data is transferred from the client application 101 to the server application 201, the response controlling unit 115 of the terminal 1 prompts the client application 101 to transmit next file data instead of the server application 201, as a response.

That is, the response controlling units 115 and 215 notify the client application 101 and the server application 201 of the completion of the communication, respectively. For this reason, the client application 101 and the server application 201 recognize that the communication has succeeded without knowing a result of the communication based on the bundle protocol of the bundle controlling units 120 and 220.

Therefore, the condition notification units 121 and 221 notify the user of communication information on the condition and the result of the communication by pop-up display to the screen and logs, for example. More specifically, the condition notification unit 121 of the terminal 1 outputs the communication information to the display unit 16 or writes into the storage unit 13 a log file in which the communication information is recorded. The condition notification unit 221 of the server 2 writes into the HDD 23 a log file in which the communication information is recorded.

The proxy controlling units 111 and 211 instruct the condition notification units 121 and 221 to output a notification depending on the condition of the communication, respectively. The notification includes a reception notification indicating that the transmission request of the bundle is received from the proxy controlling units 111 and 211, and a pending notification indicating that the transmission of the bundle is suspended to disconnect the connection with the communication destination.

The proxy controlling units 111 and 211 instruct the condition notification units 121 and 221 to output a notification based on various reports from the bundle controlling units 120 and 220, respectively. The notification includes a transfer failure notification based on a deletion report, a transfer completion notification based on a distribution report, and a transfer notification based on a forwarding report. Each of the proxy controlling units 111 and 211 determines whether the communication based on the bundle protocol has succeeded based on each report.

When the lifetime (see FIG. 4A) of the bundle has expired or the bundle controlling units 120 and 220 have relayed the bundle from another device, each of the bundle controlling units 120 and 220 accommodates the deletion report into another bundle and transmits the another bundle to the another device which is the transmission source of the bundle. When the bundle controlling units 120 and 220 have completed the reception of the bundle, each of the bundle controlling units 120 and 220 accommodates the distribution report or the forwarding report into another bundle and transmits the another bundle to the transmission source of the bundle. The reports are mentioned later while referring to their examples.

When each of the proxy controlling units 111 and 211 determines that the communication has failed, each of the condition notification units 121 and 221 notifies the user of the failure of the communication. When the communication completion to the communication destination has been notified to the client application 101 by the response controlling unit 115 and the communication according to the bundle protocol of the DTN has failed as a result of the determination of the proxy controlling unit 111, the condition notification unit 121 notifies the terminal 1 of the failure of the communication. At this time, the failure of the communication is notified to the user as the pop-up display of the display unit 16 of the terminal 1 or logs stored into the storage unit 13 as mentioned later. As with the condition notification unit 121, when the communication completion to the communication destination has been notified to the server application 201 by the response controlling unit 215 and the communication according to the bundle protocol of the DTN has failed as a result of the determination of the proxy controlling unit 211, the condition notification unit 221 also notifies the server 2 of the failure of the communication.

For this reason, even when the communication based on the bundle protocol is performed and the client application 101 and the server application 201 recognize that the communication has succeeded, the user can know the failure of the communication by the notification of the condition notification units 121 and 221. Therefore, the user can easily grasp the communication result. Here, each of the condition notification units 121 and 221 is an example of a failure notification unit.

The connection monitoring units 112 and 212 monitors the condition of the connection of the bundle controlling units 120 and 220, respectively. The connection monitoring units 112 and 212 perform the connection in a state where the connection is disconnected. When the connection has succeeded, the connection monitoring units 112 and 212 instruct the bundle controlling units 120 and 220 to transmit the transmission object bundle in the bundle buffers 122 and 222, respectively.

The connection monitoring units 112 and 212 perform setting and deletion of conversion information to the address conversion units 113 and 213 in accordance with the condition of the connection, respectively. The connection monitoring units 112 and 212 set the conversion information based on the filter TBLs 118 and 218, respectively.

FIG. 5B illustrates an example of the filter TBLs 118 and 218. A filter condition of the packet, conversion information, and a setting state are associated with each other and registered into the filter TBLs 118 and 218. The filter condition designates the transmission source of an address conversion object packet, the IP address of the destination, the port number and so on. The conversion information indicates a part of the packet to be rewritten meeting the filter condition, and a value of the part after rewriting. The setting state indicates the validity or invalidity of setting of the filter condition and the conversion information.

The connection monitoring units 112 and 212 perform setting and deletion of the conversion information of the address conversion units 113 and 213 in accordance with the condition of the connection, respectively. Therefore, the bundle protocol is automatically applied to the communication of the client application 101 and the server application 201.

Thus, each of the connection monitoring units 112 and 212 detects the condition of the connection with the communication destination, and decides whether the bundle protocol is applicable to the communication of the client application 101 and the server application 201 in accordance with the condition of the connection. For this reason, the bundle protocol is used for the communication of the client application 101 and the server application 201 in accordance with the condition of the connection.

When the communication becomes intermittent, the client application 101 and the server application 201 communicate by protocol-converting the TCP/IP with the use of the configuration mentioned above.

Figure 6:
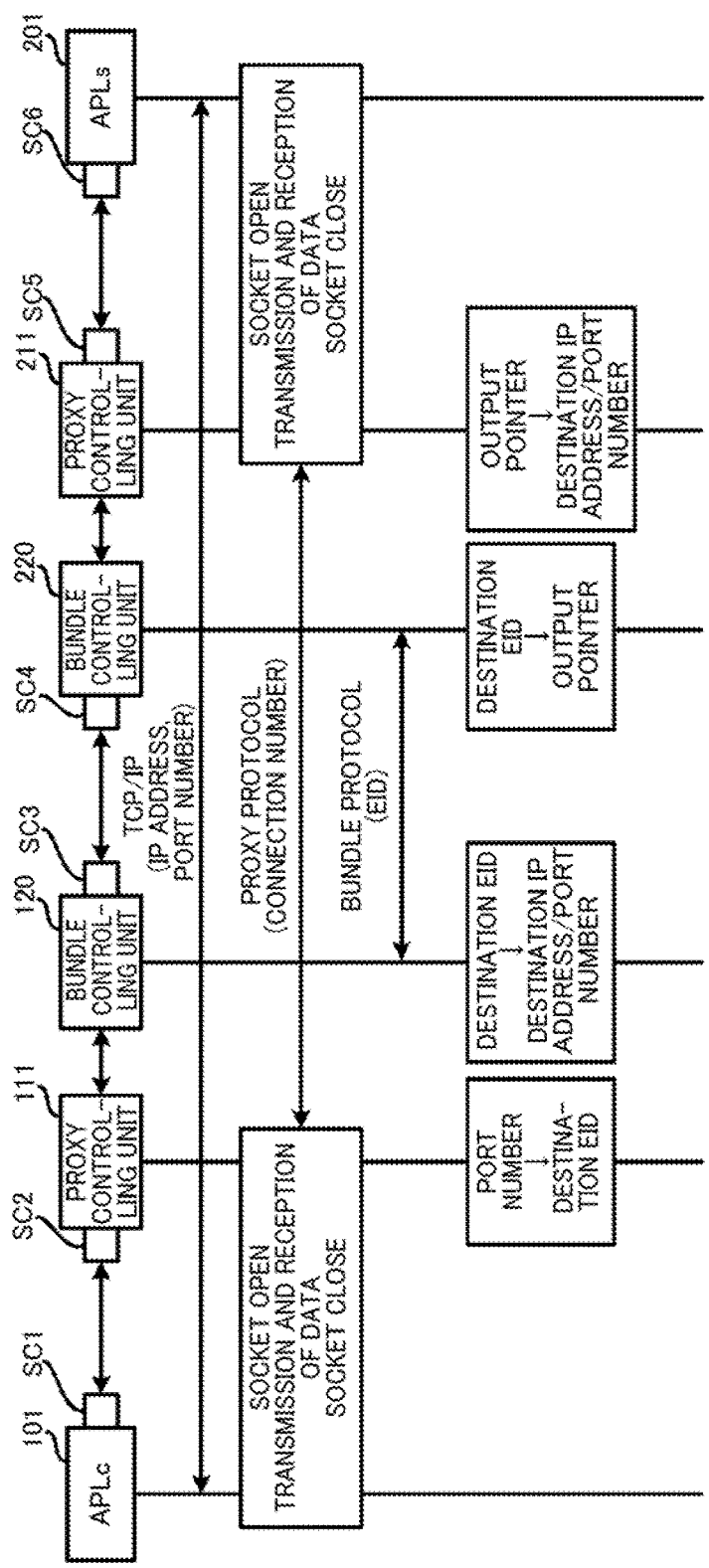
FIG. 6 is a diagram illustrating an example of protocol conversion.

FIG. 6 illustrates an example of the protocol conversion. FIG. 6 illustrates the client application 101, the proxy controlling unit 111 and the bundle controlling unit 120 in the terminal 1, and the server application 201, the proxy controlling unit 211 and the bundle controlling unit 220 in the server 2 from among the configuration illustrated in FIG. 3.

The communication of the TCP/IP using the IP address and the port number is performed between the client application 101 and the server application 201. Any socket SC1 is opened in the client application 101, and a fixed socket SC6 is opened in the server application 201.

The communication according to a proxy protocol with the use of the connection number is performed between the proxy controlling units 111 and 211. In the proxy controlling unit 111, a socket SC2 corresponding to the socket SC6 of the server application 201 one-on-one is opened by the transmission and reception controlling unit 114. In the proxy controlling unit 211, a socket SC5 corresponding to the socket SC1 of the client application 101 one-on-one is opened by the transmission and reception controlling unit 214.

The communication by the sockets SC1 and SC2 is performed between the client application 101 and the proxy controlling unit 111, and the communication by the sockets SC5 and SC6 is performed between the server application 201 and the proxy controlling unit 211. For this reason, the transmission and reception controlling units 114 and 214 open and close the sockets SC2 and SC5 in accordance with the opening and closing of the respective sockets SC1 and SC6 of the client application 101 and the server application 201, and transmit and receive data via the sockets SC2 and SC5.

The communication of the bundle protocol using the EID is performed between the bundle controlling units 120 and 220. In the bundle controlling units 120 and 220, the sockets SC3 and SC4 are opened, respectively.

When the communication from the client application 101 to the server application 201 is performed, in the terminal 1, the proxy controlling unit 111 converts the port number of the packet into the destination EID based on the initial setting file 117, and the bundle controlling unit 120 converts the destination EID into the destination IP address and the port number based on the route TBL 123.

Moreover, in the server 2, the bundle controlling unit 220 converts the destination EID into an output pointer mentioned later, and the proxy controlling unit 211 converts the output pointer into the destination IP address and the port number. In this way, the communication from the client application 101 to the server application 201 is performed. Hereinafter, a description will be given of processing executed in the communication.

Figure 7:
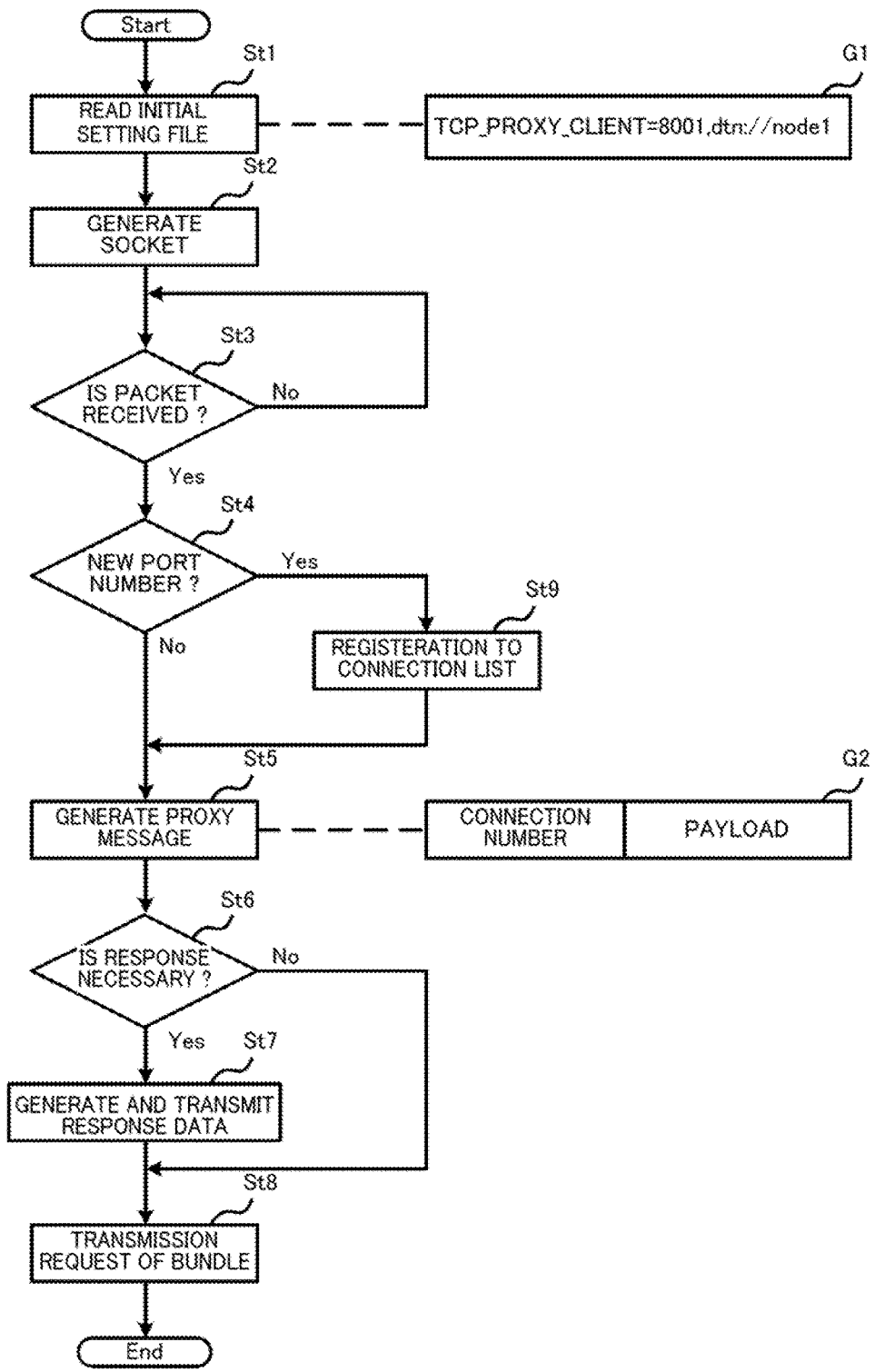
FIG. 7 is a flowchart illustrating an example of data transmission processing by a client application.

FIG. 7 is a flowchart illustrating an example of data transmission processing by the client application 101. The proxy controlling unit 111 of the terminal 1 reads the initial setting file 117 as illustrated by a code G1 (step St1). An EID "dtn://node1" of the terminal 1, and a port number "8001" for receiving the packet for the server application 201 of the communication destination by the TCP are written in the initial setting file 117, as "TCP_PROXY_CLIENT".

Next, the proxy controlling unit 111 generates, in the transmission and reception controlling unit 114, a socket for receiving the packet for the server application 201 from the client application 101 (step St2). The above-mentioned port number "8001" or a loop-back IP address "127.0.0.1" is set to the socket. The client application 101 transmits the packet to the socket generated by the transmission and reception controlling unit 114 as substitute for the socket of the server application 201. At this time, the destination IP address of the packet and the port number are converted by a predetermined setting or the address conversion unit 113.

Next, the transmission and reception controlling unit 114 determines whether the socket receives the packet (step St3). When the packet is not received (No in step St3), the determination process of step St3 is performed again.

When the packet is received (Yes in step St3), the proxy controlling unit 111 determines whether the port number of the transmission source of the packet is new (step St4). That is, the proxy controlling unit 111 determines whether the port number of the client application 101 is changed and the new channel is established. Here, when the packet is received by the socket, the transmission and reception controlling unit 114 detects the completion of the communication from the client application 101, and outputs data of the receive packet to the proxy controlling unit 111 via the memory.

When the port number of the transmission source is new (Yes in step St4), the proxy controlling unit 111 registers a new connection number, a socket channel ID and a destination EID corresponding to the new connection number into the connection list 116 (step St9). Moreover, when the port number of the transmission source is not new (No in step St4), the proxy controlling unit 111 does not perform the processing of step St9.

Next, the proxy controlling unit 111 generates the proxy message as illustrated by a code G2 (step St5). The connection number and the payload are included in the proxy message. The proxy controlling unit 111 accommodates data of the packet into the payload and adds the connection number searched from the connection list 116 to generate the proxy message. The proxy message is output to the bundle controlling unit 120 by the bundle API.

Next, the response controlling unit 115 determines whether the response to the transmission object packet is necessary (step St6). The response controlling unit 115 determines whether there is a response, not an ACK of the TCP, necessary for the continuation of the communication in the application level.

When the response is necessary (Yes in step St6), the response controlling unit 115 generates response data as substitute for the server application 201 based on a predetermined algorithm, and transmits the response data to the client application 101 (step St7). That is, the response controlling units 115 and 215 notify the client application 101 and the server application 201 of the completion of the communication, respectively. For this reason, the client application 101 recognizes that the communication has succeeded even when the communication of the bundle protocol has failed, as described above. When the response is not necessary (No in step St6), the response controlling unit 115 does not generate the response data.

Next, the proxy controlling unit 111 requests the bundle controlling unit 120 to transmit the bundle by the bundle API (step St8). The bundle controlling unit 120 generates the bundle from the proxy message to transmit the bundle. Thereby the bundle controlling units 120 and 220 perform the communication from the client application 101 and the server application 201 to the communication destination based on the protocol of the DTN. In this way, the data transmission processing of the client application 101 is performed.

Figure 8:
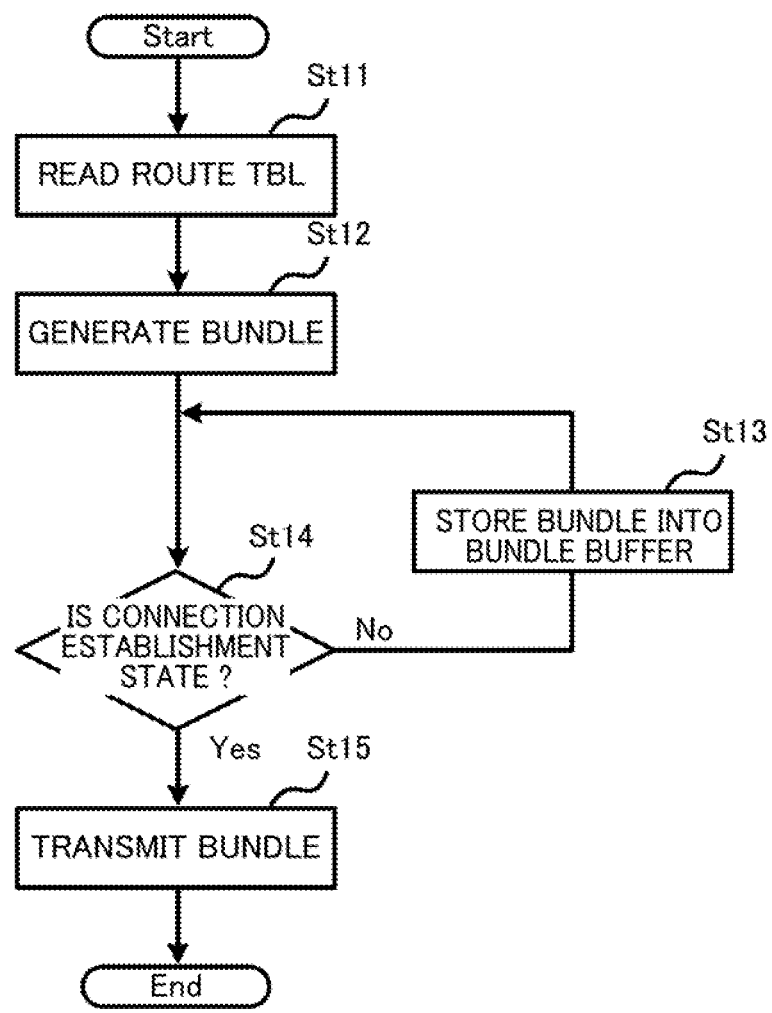
FIG. 8 is a flowchart illustrating an example of transmission processing of the bundle.

FIG. 8 is a flowchart illustrating an example of transmission processing of the bundle. When the transmission of the bundle is requested from the proxy controlling unit 111, the bundle controlling unit 120 reads the route TBL 123 (step St11). Next, the bundle controlling unit 120 generates the bundle of the destination EID corresponding to the destination IP address and the port number based on the route TBL 123 (step St12).

The bundle controlling unit 120 determines whether the connection with the communication destination depending on the destination EID is an establishment state (step St14). When the connection is not the establishment state (No in step St14), the bundle controlling unit 120 stores the bundle into the bundle buffer 122 (step St13), and the processing of step St14 is performed again.

When the connection is the establishment state (yes in step St14), the bundle controlling unit 120 transmits the bundle (step St15). In this way, the transmission processing of the bundle is performed.

Figure 9:
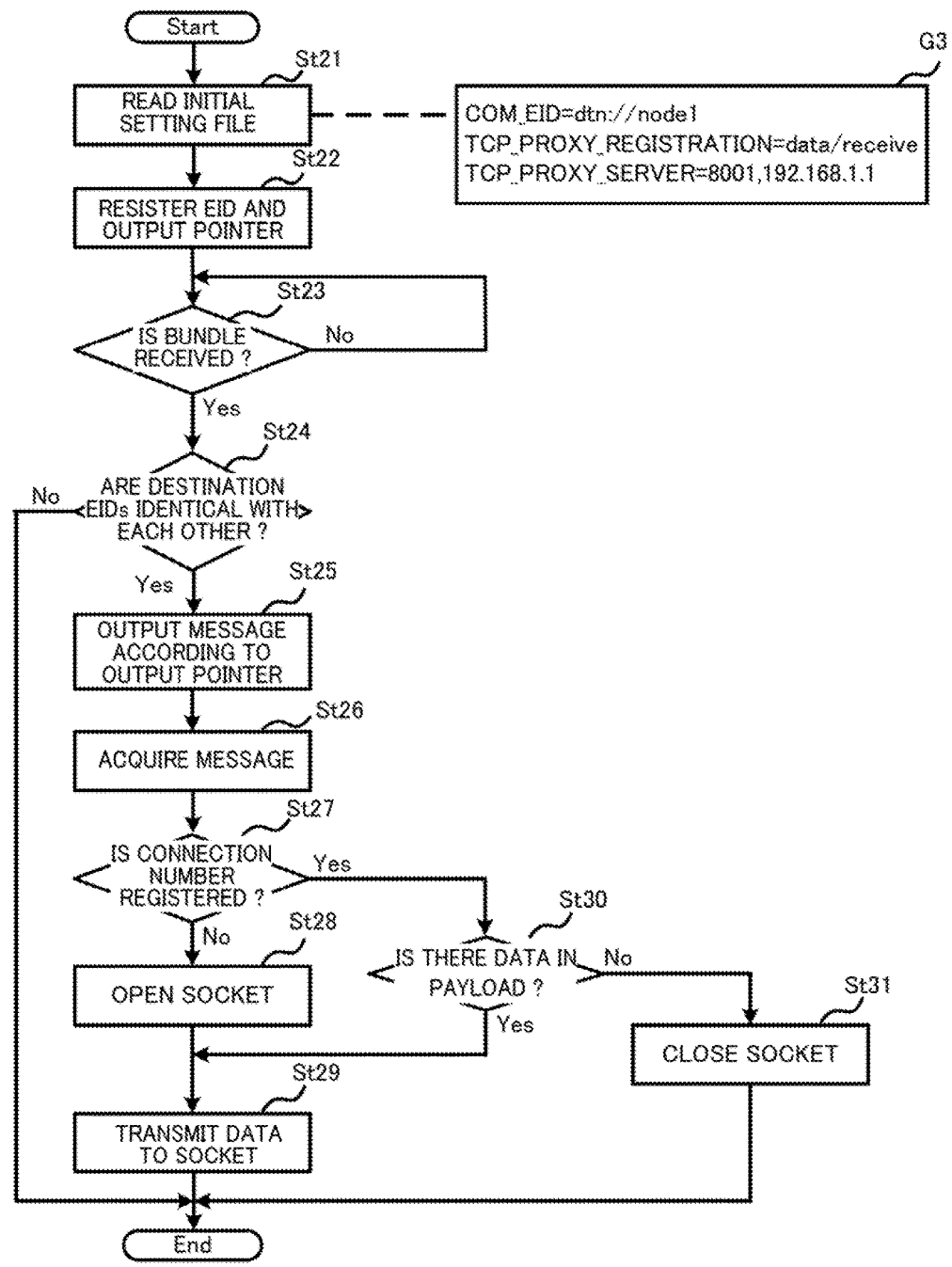
FIG. 9 is a flowchart illustrating an example of reception processing of the bundle.

FIG. 9 is a flowchart illustrating an example of reception processing of the bundle. The present processing is performed by the server 2.

The proxy controlling unit 211 reads the initial setting file 217 as illustrated by a code G3 (step St21). An EID "dtn://node1" of the server 2 is recorded in the initial setting file 217 as "COM_EID", an output pointer "data/service" of the reception data of the server 2 is recorded in the initial setting file 217 as "TCP_PROXY_REGISTRATION", and an IP address "192.168.1.1" and a port number "8001" of the server 2 are recorded in the initial setting file 217 as "TCP_PROXY_SERVER".

Next, the proxy controlling unit 211 resisters the EID and the output pointer into the bundle controlling unit 220 with the use of the bundle API so that the bundle controlling unit 220 can receive the bundle from the client application 101 of the terminal 1 (step St22). At this time, the proxy controlling unit 211 registers the EID and the output pointer designated respectively by the "COM_EID" and the "TCP_PROXY_REGISTRATION" of the initial setting file 217 into the bundle controlling unit 220. Thereby, when the bundle controlling unit 220 receives the bundle, the bundle controlling unit 220 outputs the bundle to a designated directory of an output pointer "data/receive".

Next, the bundle controlling unit 220 determines whether the bundle is received (step St23). When the bundle is not received (No in step St23), the bundle controlling unit 220 performs the processing of step St23 again. Moreover, when the bundle is received (Yes in step St23), the bundle controlling unit 220 determines whether the destination EID of the bundle is identical with the EID registered in step St22 (step St24).

When the destination EID of the bundle is not identical with the registered EID (No in step St24), the bundle is not for the server 2 and the bundle controlling unit 220 discards the bundle to finish the processing. When the destination EID of the bundle is identical with the registered EID (Yes in step St24), the bundle controlling unit 220 acquires data of the packet from the payload of the packet, generates the proxy message, and outputs the proxy message to the designated directory of the output pointer (step St25).

Next, the proxy controlling unit 211 acquires the proxy message with reference to the designated directory of the output pointer (step St26). Next, the proxy controlling unit 211 determines whether the connection number of the proxy message is registered into the connection list 216 (step St27).

When the connection number is not registered (No in step St27), the proxy controlling unit 211 instructs the transmission and reception controlling unit 214 to open the socket of the IP address and the port number designated by the "TCP_PROXY_SERVER" of the initial setting file 217 (step St28). When the connection number is registered (Yes in step St27), the proxy controlling unit 211 determines whether the data of the packet is accommodated into the payload of the proxy message (step St30).

When the data of the packet is accommodated (Yes in step St30), the proxy controlling unit 211 transmits the data to a corresponding socket (step St29). When the data of the packet is not accommodated (No in step St30), the proxy controlling unit 211 instructs the transmission and reception controlling unit 214 to close the corresponding socket (step St31). In this way, the reception processing of the bundle is performed.

Thus, between the client application 101 and the server application 201, the opening and closing of the socket are reproduced based on the operation of the application by the proxy protocol function units 110 and 210 independently of the presence or absence of the connection between the terminal 1 and the server 2. For this reason, even when the connection between the client application 101 and the server application 201 is disconnected, the communication can be continued.

As described above, the connection monitoring units 112 and 212 perform the setting or deletion of the conversion information of the address conversion units 113 and 213 in accordance with the condition of the connection, respectively. For this reason, the bundle protocol is automatically applied to the communication of the client application 101 and the server application 201.

Figure 10:
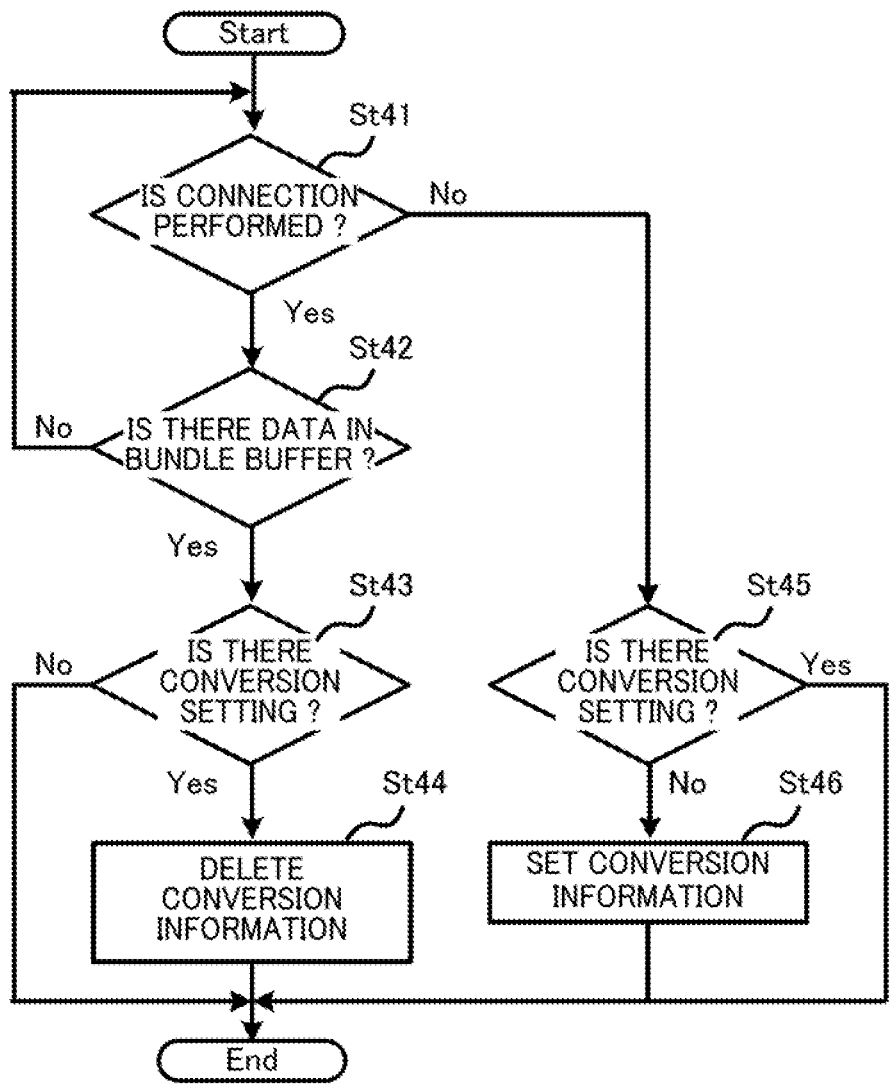
FIG. 10 is a flowchart illustrating an example of switching processing of application of a bundle protocol.

FIG. 10 is a flowchart illustrating an example of switching processing of the application of the bundle protocol. Each of the connection monitoring units 112 and 212 detects the presence or absence of the connection with the communication detection (step St41).

The bundle controlling units 120 and 220 detect the link-up/link-down with a corresponding communication destination based on the destination IP addresses and the port numbers set in the route TBLs 123 and 223, respectively, and detect the condition of the communication by a keep alive function. The connection monitoring units 112 and 212 acquire the detection result of the bundle controlling units 120 and 220, respectively, or detect the condition of the connection by the controlling with the use of the bundle API.

When the connection with the communication detection is detected (Yes in step St41), the connection monitoring units 112 and 212 determine whether the bundles to be transmitted are stored into the bundle buffers 122 and 222, respectively (step St42). When there are no stored bundles (No in step St42), each of the connection monitoring units 112 and 212 performs the processing of step St41 again.

When there are the stored bundles (Yes in step St42), the connection monitoring units 112 and 212 determine whether there are the settings of the conversion information for the address conversion units 113 and 213 by referring to the setting states of the filter TBLs 118 and 218, respectively (step St43). When there are no settings of the conversion information (No in steps St43), each of the connection monitoring units 112 and 212 finishes the processing. When there are settings of the conversion information (Yes in steps St43), each of the connection monitoring units 112 and 212 deletes the conversion information (step St44).

Thereby, the transmission of the packets from the TCP processing units 102 and 202 to the sockets of the transmission and reception controlling units 114 and 214 is stopped. Therefore, the application of the bundle protocol is stopped for the communication between the client application 101 and the server application 201, so that the direct communication of the TCP/IP is performed without passing through the proxy protocol function units 110 and 210.

On the other hand, when the connection is disconnected, i.e., the connection with the communication detection is not detected (No in step St41), the connection monitoring units 112 and 212 determine whether there are the settings of the conversion information for the address conversion units 113 and 213 by referring to the setting states of the filter TBLs 118 and 218, respectively (step St45). When there are the settings of the conversion information (Yes in steps St45), each of the connection monitoring units 112 and 212 finishes the processing. When there are no settings of the conversion information (No in steps St45), each of the connection monitoring units 112 and 212 sets the conversion information (step St46).

Thereby, the transmission of the packets from the TCP processing units 102 and 202 to the sockets of the transmission and reception controlling units 114 and 214 is started. Therefore, the application of the bundle protocol is started for the communication between the client application 101 and the server application 201, so that the communication is performed through the proxy protocol function units 110 and 210.

Thus, each of the connection monitoring units 112 and 212 detects the condition of the connection with the communication destination, and decides whether the bundle protocol can be applied to the communication between the client application 101 and the server application 201. Therefore, the application of the bundle protocol is automatically performed.

Here, when the bundle protocol is not applied and the connection is disconnected during the communication, the communication cannot be continued. For this reason, each of the connection monitoring units 112 and 212 may decide whether the bundle protocol can be applied to the communication by another determination processing different from the above-mentioned determination processing.

For example, each of the connection monitoring units 112 and 212 predicts a communicable time of a communication interface by referring to an identifier and a communication history of the physical communication interface, and when the connection of the communication interface having a short communicable time is used based on the prediction result, each of the connection monitoring units 112 and 212 always may apply the bundle protocol to the communication. When a large-capacity file requiring a long communicable time is transferred, each of the connection monitoring units 112 and 212 always may apply the bundle protocol to the communication. In this case, even when the terminal 1 is connected to the AP of Wi-Fi connectable for a short time, for example, the communication can be continued.

However, when the bundle protocol is applied to the communication, a data amount for the overhead of the bundle is added to the data of the packet, and hence the load of the network NW increases compared with a case where the bundle protocol is not applied to the communication. Therefore, it is decided whether the bundle protocol can be applied to the communication by the processing illustrated in FIG. 10, so that the load of the network NW can be reduced adequately.

When the plurality of communication lines can be used, the bundle controlling unit 120 may measure a communication quality of each of the communication lines, and transmit the bundle via a selected communication line based on the measurement result, to thereby optimize the bundle communication.

FIG. 11A illustrating the bundle communication using the plurality of communication lines according to a comparative example, and FIG. 11B illustrates the bundle communication using the plurality of communication lines according to the embodiment. In this example, it is assumed that the terminal 1 of a node Na and the server 2 of a node Nb perform the bundle communication with each other via two communication lines L1 and L2.

In the comparative example, the node Na divides data DT of the bundle into blocks #1 to #n (n: a positive integer), and evenly transmits the blocks #1 to #n to the node Nb via the two communication lines L1 and L2. The node Nb receives the blocks #1 to #n via the two communication lines L1 and L2, and restores the data DT of an original bundle.

However, when the communication quality of the communication line L1 is lower than that of the communication line L2 for example, the delay, errors or lose of the blocks #1, #3, . . . , #n-1 transmitted via the communication line L1 occurs, and hence a restoration time of the data DT in the node Nb increases and a throughput decreases.

On the contrary, in the embodiment, the node Na divides a head portion of the data DT (see a dotted frame) into the blocks #1 and #2, transmits the block #1 to the node Nb via the communication line L1 and transmits the block #2 to the node Nb via the communication line L2, as illustrated by a code G4. Thereby, the node Na measures the communication qualities of the communication lines L1 and L2.

More specifically, the node Na measures times required for transmission of the blocks #1 and #2 in the head portion. The times required for transmission are calculated from transmission times of the blocks #1 and #2 and arrival times of responses from the node Nb after the reception of the blocks #1 and #2, respectively, for example. The node Na determines speeds of the communication lines L1 and L2 based on the times required for transmission. The node Na selects any one of the communication lines L1 and L2 based on a result of the determination.

When the speed of the communication line L1 is low (see "LOW SPEED") and the speed of the communication line L2 is high (see "HIGH SPEED") as illustrated by a code G5, the node Na transmits the remaining blocks #3 to #n to the node Nb via the communication line L2. Therefore, the time required for transmission of all data #1 to #n can be reduced, and the throughput can be improved.

Figure 12:
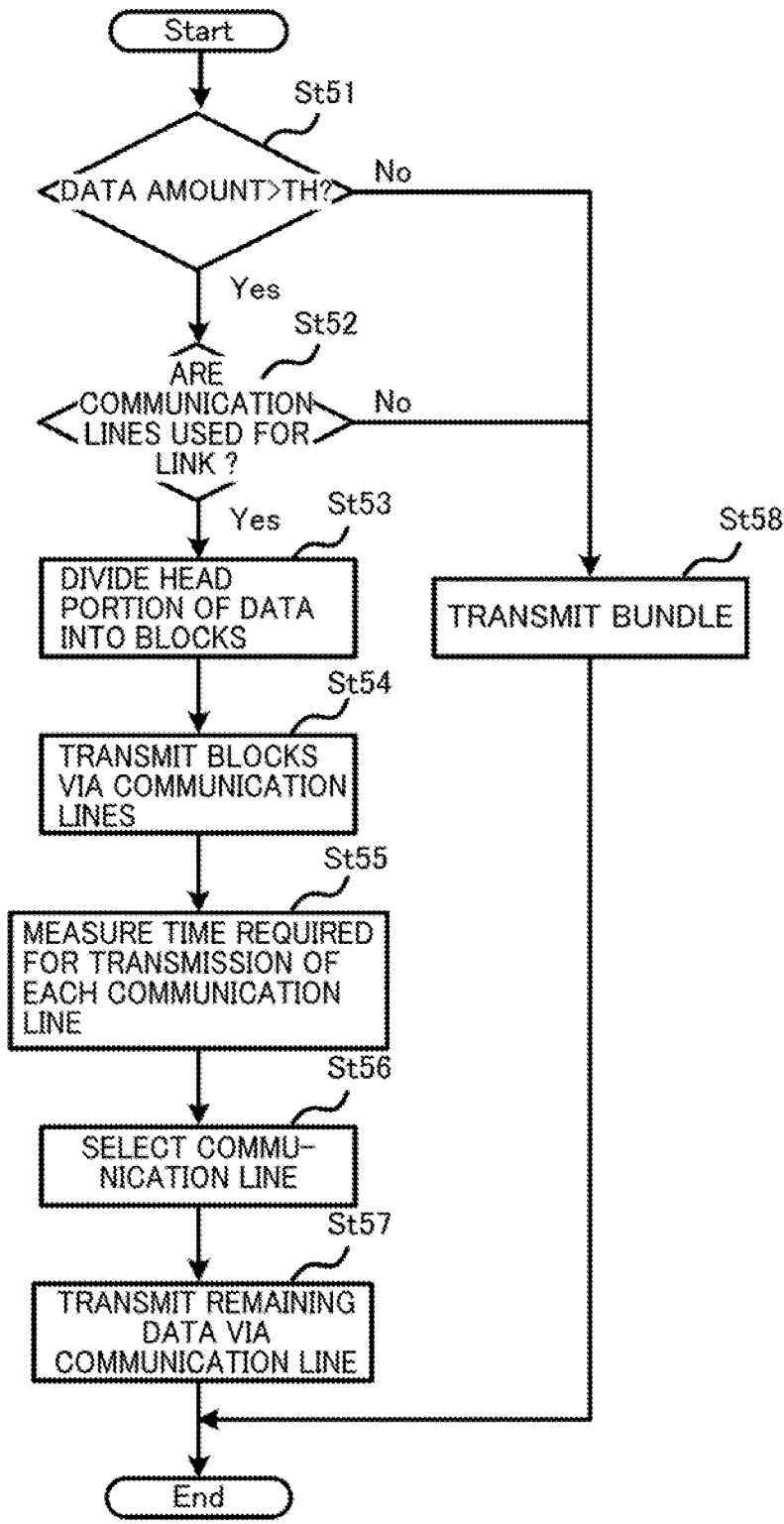
FIG. 12 is a flowchart illustrating an example of optimization processing of the bundle communication.

FIG. 12 is a flowchart illustrating an example of optimization processing of the bundle communication. The present processing is performed in the terminal 1.

The bundle controlling unit 120 compares a data amount (size) of the bundle with a threshold value TH (step St51). When the data amount of the bundle is equal to or less than the threshold value TH (No in step St51), the bundle controlling unit 120 transmits the bundle (step St58). This is because, when the size of the bundle is small, there are few blocks after the division of data of the bundle and hence the throughput might decrease more due to a measurement time of the communication quality.

When the data amount of the bundle is more than the threshold value TH (Yes in step St51), the bundle controlling unit 120 determines whether the plurality of communication lines are used for link from the information of the wireless LAM module 14 (step St52). When one of the communication lines is used for link (No in step St52), the bundle controlling unit 120 transmits the bundle (step St58). This is because there is no choice of the communication line.

When the communication lines are used for link (Yes in step St52), the bundle controlling unit 120 divides a predetermined head portion of the data of the bundle into a plurality of blocks (step St53). At this time, the bundle controlling unit 120 generates at least the same number of blocks as the communication lines.

Next, the bundle controlling unit 120 transmits the plurality of blocks via the respective communication lines (step St54). Here, the numbers of blocks to be transmitted via the respective communication lines may be the same as each other or different from each other.

Next, the bundle controlling unit 120 measures the time required for transmission of the blocks via each communication line (step St55). Here, the time required for transmission is an example of the communication quality. Next, the bundle controlling unit 120 selects one or more communication lines based on the time required for transmission (step St56). More specifically, the bundle controlling unit 120 preferentially selects the communication line having a short time required for transmission.

Next, the bundle controlling unit 120 transmits remaining data via the selected communication line (step St57). When the bundle controlling unit 120 selects only one of the communication lines, the bundle controlling unit 120 can transmit the remaining data without dividing the remaining data into the blocks. Moreover, when the bundle controlling unit 120 selects the communication lines meeting a predetermined standard value, the bundle controlling unit 120 can divide the remaining data into the blocks having a size based on the number of communication lines and transmit the divided data.

For this reason, the transmission of the remaining data is completed by the high-speed communication line in a short time. In this way, the optimization processing of the bundle communication is performed. In this example, the bundle controlling unit 120 measures the time required for transmission as the communication quality, but a measurement object is not limited to this. For example, the bundle controlling unit 120 may measure an error rate.

Thus, the bundle controlling unit 120 measures the respective communication qualities of the communication lines connected to the communication destination, selects one or more communication lines based on the respective communication qualities, and performs the bundle communication with the use of the selected communication lines. For this reason, the bundle controlling unit 120 can improve the communication qualities of the bundle communication. When the bundle controlling unit 120 can use a low speed Wi-Fi communication line and a high speed LTE (Long Term Evolution) communication line for example, the bundle controlling unit 120 can actually measure a communication speed of each of the communication lines and select the LTE communication line based on a result of the measurement.

Moreover, the bundle controlling unit 120 divides the predetermined head portion of the data into the plurality of blocks, and transmit the plurality of blocks to the communication destination via the respective communication lines. Thereby, the bundle controlling unit 120 measures the respective communication qualities of the communication lines. The bundle controlling unit 120 selects at least one communication line based on the communication qualities, and transmits another portion (other than the head portion) of the data to the communication destination via the selected communication line. For this reason, the bundle controlling unit 120 does not have to prepare for test data for the measurement of the communication qualities, and can easily measure the communication quality of each communication line by using only the head portion of the data of the bundle to be transmitted.

Next, a description will be given of functions of the condition notification units 121 and 221.

Figure 13:
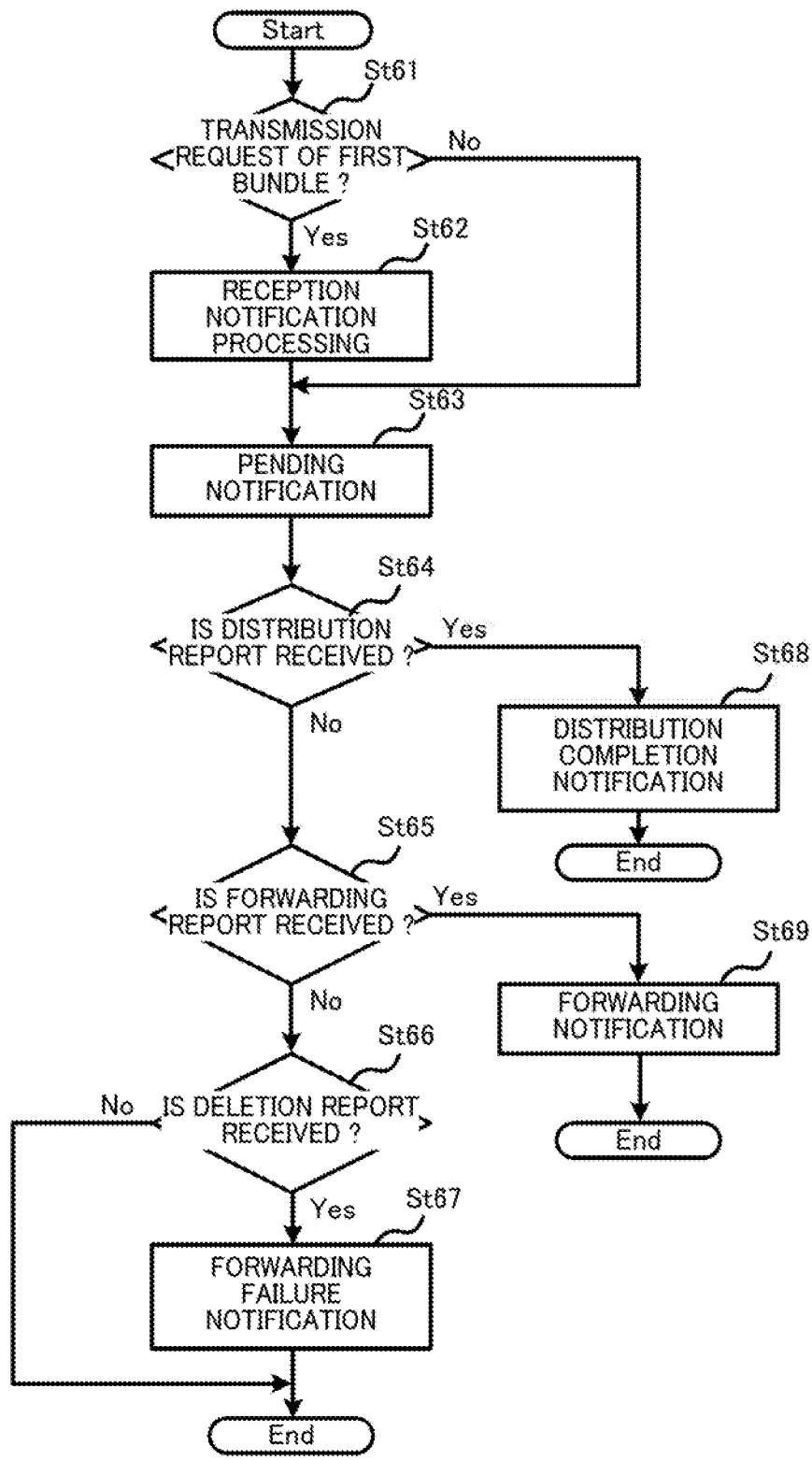
FIG. 13 is a flowchart illustrating an example of notification processing.

FIG. 13 is a flowchart illustrating an example of notification processing. In this example, the notification processing of the condition notification unit 121 in the terminal 1 is referred to, but the condition notification unit 221 in the server 2 also can perform the same notification processing.

When the proxy controlling unit 111 requests the bundle controlling unit 120 to transmit the bundle, the proxy controlling unit 111 determines whether the request is a first transmission request after start-up (step St61). When the request is the first transmission request (Yes in step St61), the proxy controlling unit 111 instructs the condition notification unit 121 to display or store the reception notification of the data transmission (step St62). The condition notification unit 121 displays the reception notification on the display unit 16 in a pop-up form or stores the reception notification into the storage unit 13 as a log. When the request is not the first transmission request (No in step St61), the proxy controlling unit 111 does not instruct the condition notification unit 121 so as not to redundantly display or store the reception notification.

Next, the proxy controlling unit 111 instructs the condition notification unit 121 to display or store the pending notification of the data transmission based on a value of a timer measuring a pending time of the bundle transmission (step St63). The pending notification is performed every time a predetermined time elapses based on the value of the timer, for example. The condition notification unit 121 displays the pending notification on the display unit 16 in the pop-up form or stores the pending notification into the storage unit 13 as the log.

The proxy controlling unit 111 outputs a request flag of a report depending on the communication result to the bundle controlling unit 120 through the bundle API. The bundle controlling unit 120 can include the report corresponding to the request flag into the bundle and transmit the bundle. Referred to as the report are the distribution report indicating that data is distributed to the destination, the forwarding report indicating that data is forwarded to a next node, and the deletion report indicating the deletion of the bundle, for example. The deletion report is issued when the bundle has not been transmitted and the lifetime of the bundle has expired or the bundle has been deleted from the bundle buffer 122 by the transmission of the bundle. In the following processing, the notification corresponding to each report is performed.

The proxy controlling unit 111 determines whether the distribution report is received (step St64). When the distribution report is received (Yes in step St64), the proxy controlling unit 111 instructs the condition notification unit 121 to display or store a distribution completion notification (step St68). The condition notification unit 121 displays the distribution completion notification on the display unit 16 in the pop-up form or stores the distribution completion notification into the storage unit 13 as the log.

When the distribution report is not received (No in step St64), the proxy controlling unit 111 determines whether the forwarding report is received (step St65). When the forwarding report is received (Yes in step St65), the proxy controlling unit 111 instructs the condition notification unit 121 to display or store the forwarding notification (step St69). The condition notification unit 121 displays the forwarding notification on the display unit 16 in the pop-up form or stores the forwarding notification into the storage unit 13 as the log.

When the forwarding report is not received (No in step St65), the proxy controlling unit 111 determines whether the deletion report is received (step St66). That is, the proxy controlling unit 111 determines whether the bundle communication has succeeded based on the deletion report.

When the deletion report is not received (No in step St66), the proxy controlling unit 111 finishes the processing. When the deletion report is received (Yes in step St66), the proxy controlling unit 111 instructs the condition notification unit 121 to display or store the forwarding failure notification (step St67). The condition notification unit 121 displays the forwarding failure notification on the display unit 16 in the pop-up form or stores the forwarding failure notification into the storage unit 13 as the log to notify the terminal 1 of the forwarding failure.

Thus, when the proxy controlling unit 111 determines that the communication has failed based on the deletion report, the condition notification unit 121 notifies the user of the failure of the communication. For this reason, even when the communication is performed based on the bundle protocol and the client application 101 and the server application 201 recognize that the communication has succeeded, the user can know the failure of the communication by the notification of the condition notification units 121 and 221.

Next, a description will be given of an operation example of the communication between the client application 101 and the server application 201.

(Communication Operation Example 1)

Figure 15:
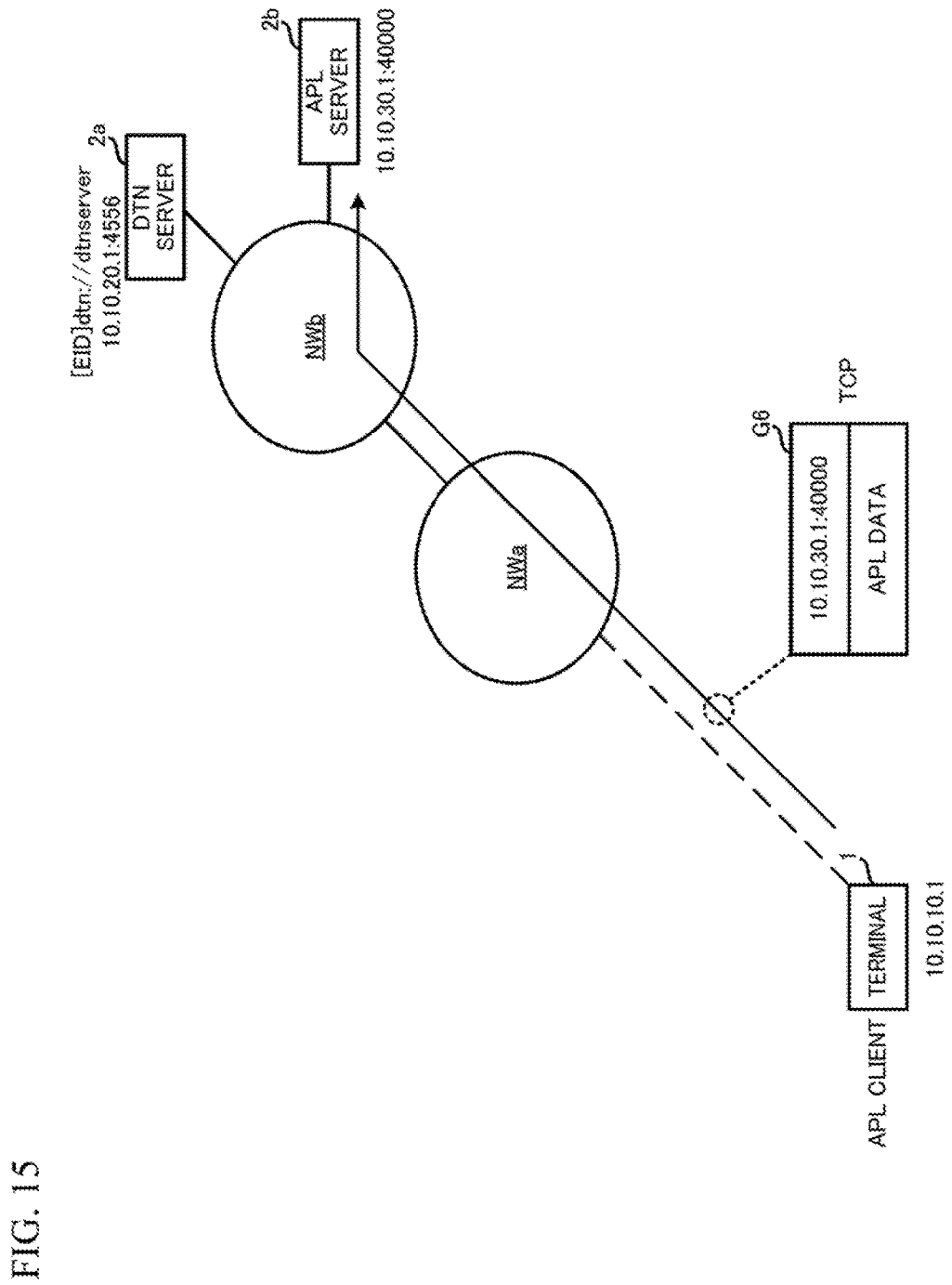
FIG. 15 is a diagram illustrating the communication operation example 1.

FIGS. 14A to 14D illustrates the initial setting file 117, the route TBL 123, the initial setting file 217 and the route TBL 223 of a communication operation example 1, respectively. FIGS. 15 to 19 illustrate the communication operation example 1 in a time series manner. In this example, it is assumed that the file transmission from the terminal 1 which is an application client (APL client) to an application server (APL server) 2b is performed, as illustrated in FIG. 15.

The APL server 2b includes the application function unit 200 from among the server 2 of FIG. 3. A DTN server 2a includes other units other than the application function unit 200 from among the server 2 of FIG. 3. Each of the DTN server 2a and the APL server 2b has the same configuration as FIG. 2, and is connected to an internet NWb. Here, there may be a plurality of APL servers 2b.

Thus, the application function unit 200 of the server 2 is implemented in other device, so that other units such as the proxy controlling unit 211 of the server 2 can be configured as a communication device independent of the server application 201.

Moreover, the terminal 1 is connected to an access network NWa via a wireless communication line illustrated by a dotted line. An AP (e.g., a hotspot of the Wi-Fi) to which the terminal 1 can link is included in the access network NWa.

FIGS. 14A and 14B illustrate the initial setting file 117 and the route TBL 123 of the APL client (terminal 1), and FIGS. 14C and 14D illustrate the initial setting file 217 and the route TBL 223 of the APL server 2b. The initial setting files 117 and 217 and the route TBLs 123 and 223 are stored beforehand into the APL client and the APL server 2b before the start-up of the application.

By the initial setting file 117, an EID "dtn://node1" is set to the terminal 1, an IP address "10.10.30.1" and a port number "40000" of the APL server 2b are set as the communication destination of the client application 101. Moreover, a destination EID "dtn://dtnserver", a destination IP address "10.10.20.1" and a port number "4556" of the DTN server 2a are set to the terminal 1 based on the route TBL 123.

By the initial setting file 217, the EID "dtn://dtnserver" is set to the DTN server 2a, and the IP address "10.10.30.1" and the port number "40000" of the APL server 2b are set to the DTN server 2a. Moreover, a destination EID "dtn://node 1", a destination IP address "10.10.10.1" and a port number "4556" of the terminal 1 are set to the DTN server 2a based on the route TBL 223.

FIG. 15 illustrates a condition of the communication when the terminal 1 is connected to the access network NWa. In this case, the connection monitoring unit 112 of the terminal 1 determines that the connection is performed, and therefore the connection monitoring unit 112 does not set the conversion information to the address conversion units 113. For this reason, the client application 101 directly communicates with the APL server 2b by the TCP/IP. A code G6 indicates application data (APL data) of the TCP to be transmitted by the terminal 1. The APL data (packet) has the IP address "10.10.30.1" and the port number "40000" as the destination.

Figure 16:
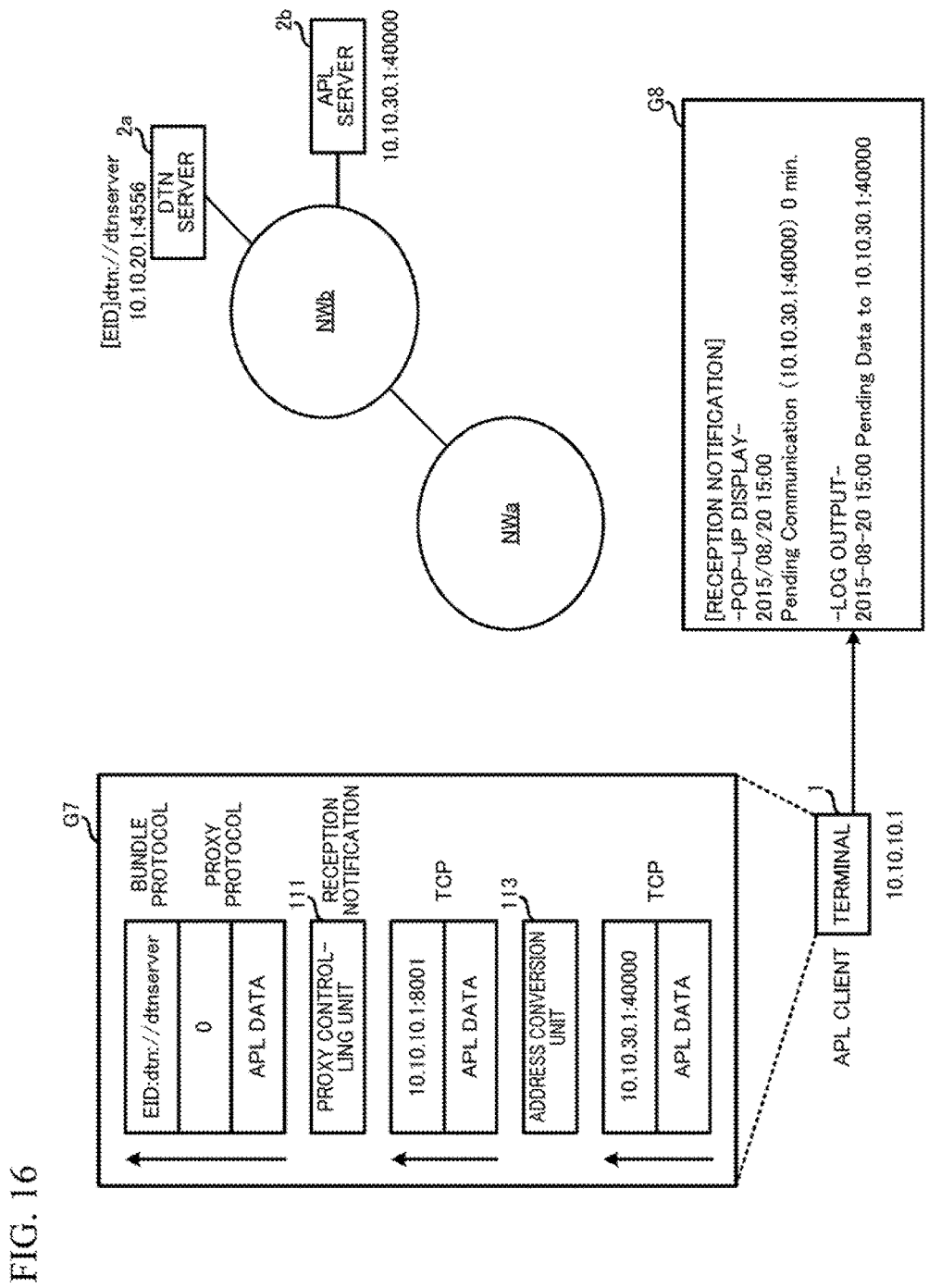
FIG. 16 is a diagram illustrating the communication operation example 1.

FIG. 16 illustrates a condition of the communication when the terminal 1 is not connected to the access network NWa. In this case, the connection monitoring unit 112 determines that the connection is disconnected, and therefore the connection monitoring unit 112 sets the conversion information to the address conversion units 113. Thereby, the APL data of the client application 101 is converted by the address conversion unit 113 and received by the socket of the transmission and reception controlling unit 114 so as to be processed by the proxy protocol function unit 110.

More specifically, as illustrated by a code G7, the APL data having the IP address "10.10.30.1" and the port number "40000" as the destination is converted into APL data having the IP address "10.10.10.1" and the port number "8001" as the destination by the address conversion unit 113. When the proxy controlling unit 111 receives the converted APL data, the proxy controlling unit 111 instructs the condition notification unit 121 to display or output reception notification of the APL data.

The condition notification unit 121 displays the reception notification on the display unit 16 in the pop-up form or outputs the logs to the storage unit 13 as illustrated by a code G8. The reception notification includes the date and time of the reception, the IP address and the port number of the communication destination, and so on.

The proxy controlling unit 111 requests the bundle controlling unit 120 to transmit the APL data. At this time, proxy controlling unit 111 accommodates the APL data into the payload of the proxy message to output the proxy message to the bundle controlling unit 120. In response to the request, the bundle controlling unit 120 accommodates the APL data into the bundle for the EID "dtn://dtnserver" based on the route TBL 123 and attempts the transmission of the bundle. However, the connection with the access network NWa is disconnected, and therefore the bundle controlling unit 120 stores the bundle into the bundle buffer 122.

Figure 17:
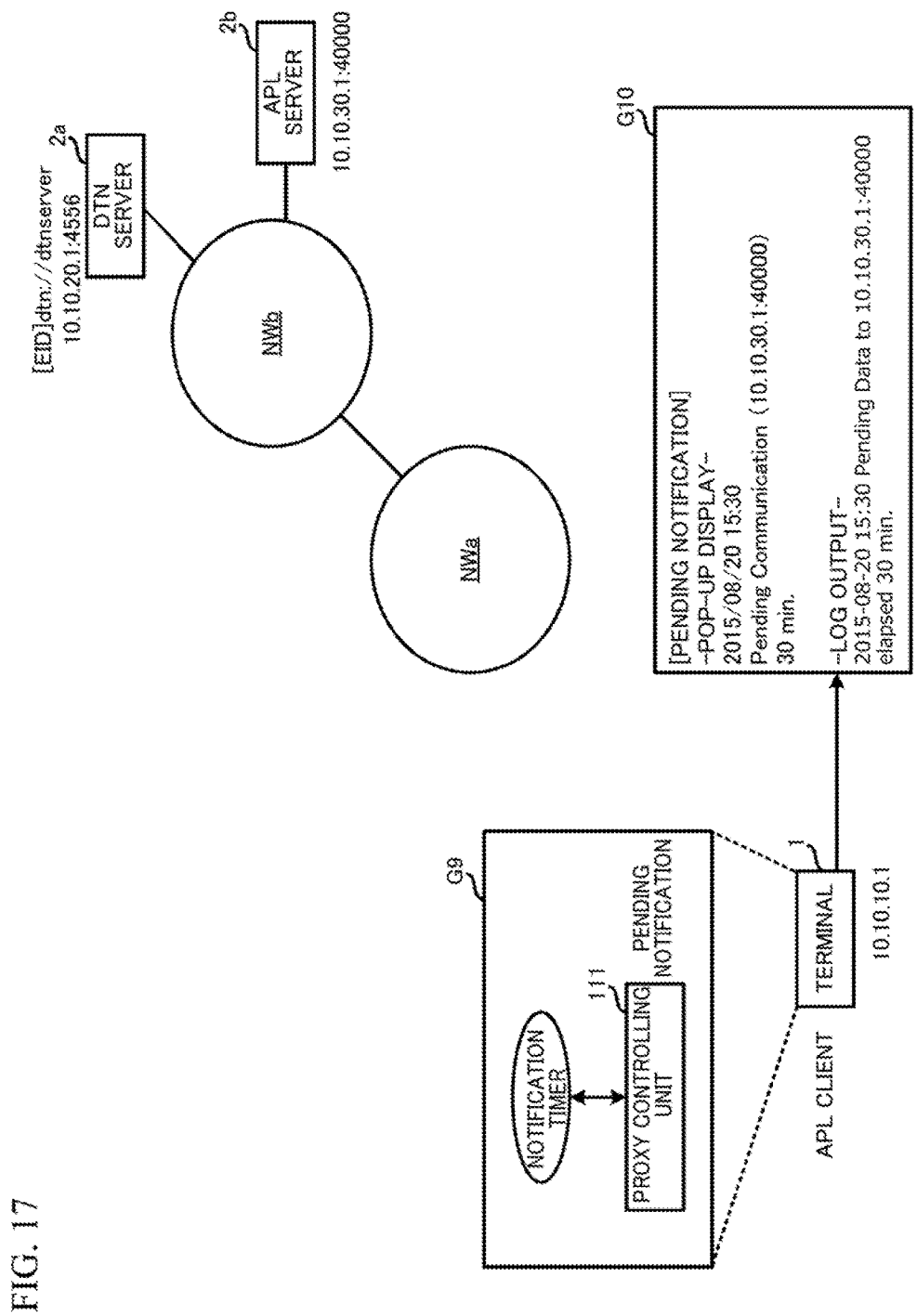
FIG. 17 is a diagram illustrating the communication operation example 1.

FIG. 17 illustrates a pending condition of the bundle communication. While the connection with the access network NWa is disconnected, the proxy controlling unit 111 measures a transmission pending time of the bundle with the use of a notification timer, as illustrated by a code G9. When the notification timer has expired, the proxy controlling unit 111 instructs the condition notification unit 121 to display or output the pending notification.

The condition notification unit 121 displays the pending notification on the display unit 16 in the pop-up form or outputs the logs to the storage unit 13 as illustrated by a code G10. The pending notification includes a current date, a current time, the pending time, the IP address and the port number of the communication destination, and so on.

Figure 18:
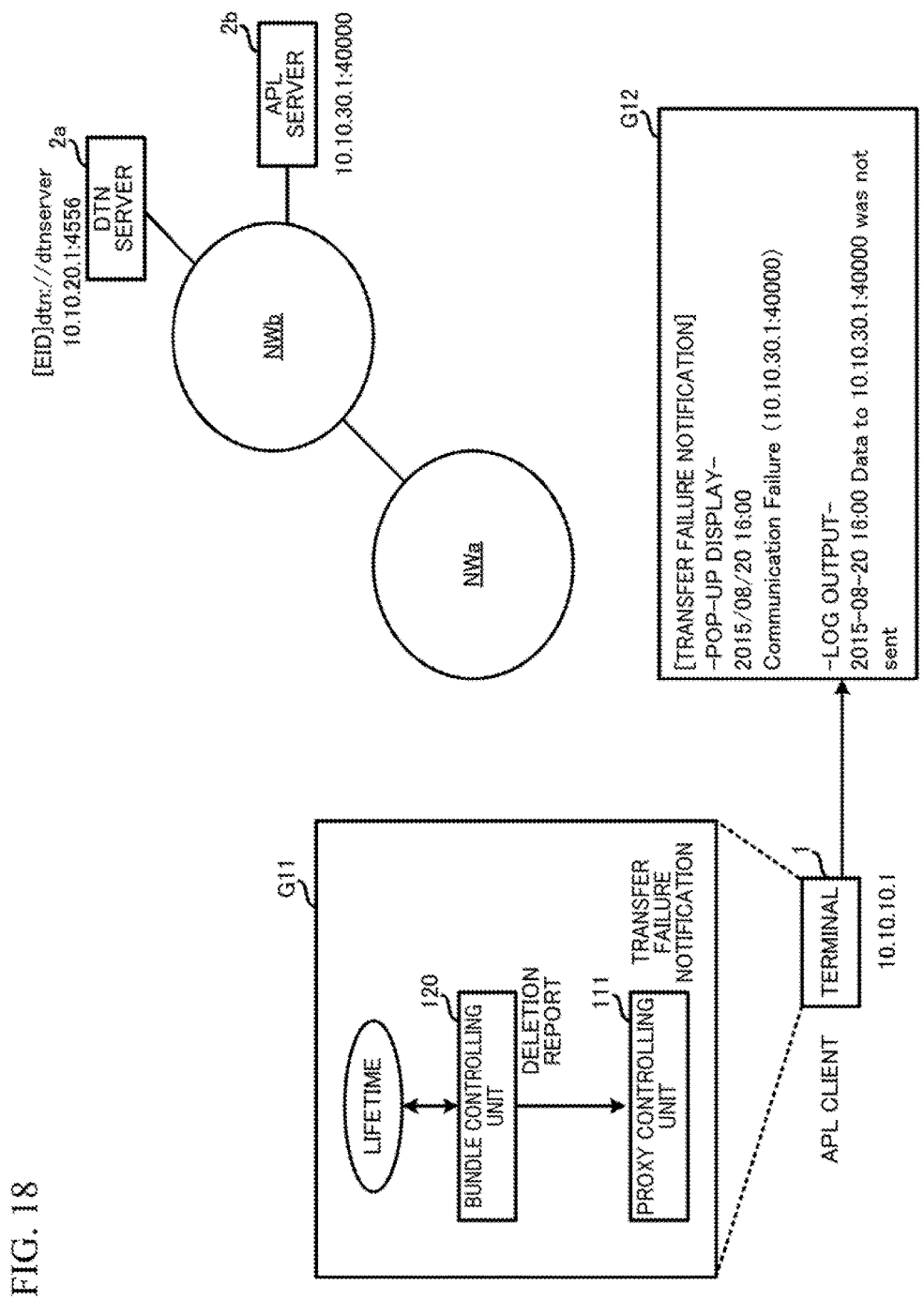
FIG. 18 is a diagram illustrating the communication operation example 1.

FIG. 18 illustrates a condition where the transmission of the bundle has failed by the expiration of the lifetime. The bundle controlling unit 120 manages the lifetime of the bundle with the use of the timer and outputs the deletion report to the proxy controlling unit 111 when the lifetime has expired, as illustrated by a code G11. When the proxy controlling unit 111 receives the deletion report, the proxy controlling unit 111 instructs the condition notification unit 121 to display or output the transfer failure notification.

The condition notification unit 121 displays the transfer failure notification on the display unit 16 in the pop-up form or outputs the logs to the storage unit 13 as illustrated by a code G12. The transfer failure notification includes date and time of the failure, the IP address and the port number of the communication destination, and so on.

Figure 19:
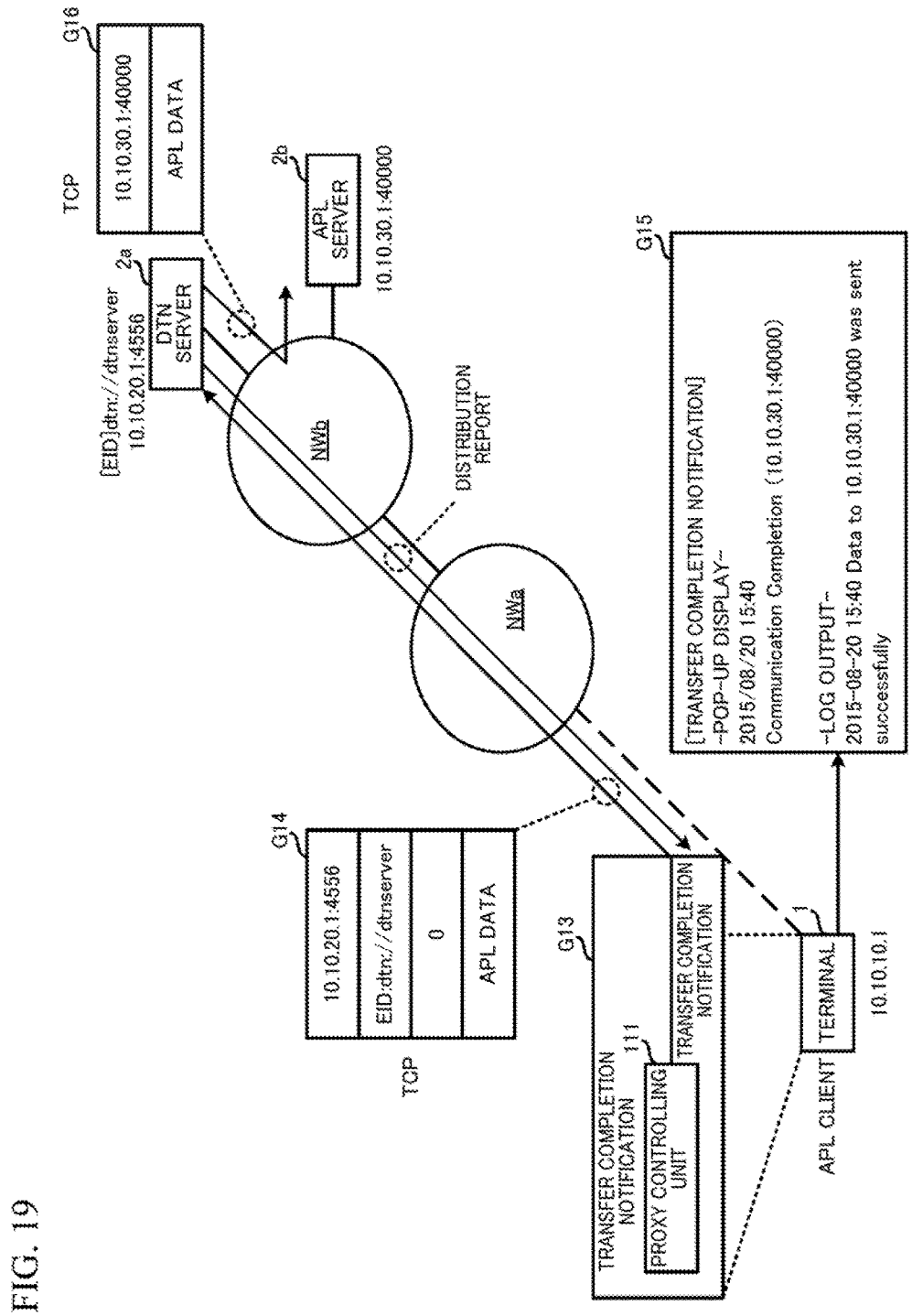
FIG. 19 is a diagram illustrating the communication operation example 1.

FIG. 19 illustrates a condition where the terminal 1 is reconnected to the access network NWa before the expiration of the lifetime and therefore the bundle is transmitted. When the bundle controlling unit 120 detects the establishment of the connection with access network NWa, the bundle controlling unit 120 reads the bundle from the bundle buffer 122 and transmits the bundle as illustrated by a code G13.

The bundle is transmitted to the destination EID "dtn:// dtnserver" corresponding to the IP address "10.10.20.1" and the port number "4556" on the TCP, as illustrated by a code G14. In the DTN server 2a, when the bundle controlling unit 220 receives the bundle, the bundle controlling unit 220 transmits the proxy message to the proxy controlling unit 211. The proxy controlling unit 211 receives the APL data from a designation directory "data/receive" of an output pointer set by the initial setting file 217.

The proxy controlling unit 211 establishes, by the TCP, the connection with the IP address "10.10.30.1" and the port number "40000" of the APL server 2b set by the initial setting file 217, and transmits the APL data of the destination, as illustrated by a code G16. When the output of the APL data to the proxy controlling unit 211 is completed, the bundle controlling unit 220 recognizes that the transfer has completed, and transmits the distribution report to the terminal 1.

In the terminal 1, when the bundle controlling unit 120 receives the distribution report, the bundle controlling unit 120 transfers the distribution report to the proxy controlling unit 111. When the proxy controlling unit 111 receives the distribution report, the proxy controlling unit 111 instructs the condition notification unit 121 to display or output the transfer completion notification.

The condition notification unit 121 displays the transfer completion notification on the display unit 16 in the pop-up form or outputs the logs to the storage unit 13 as illustrated by a code G15. The transfer completion notification includes date and time of the transfer completion, the IP address and the port number of the communication destination, and so on.

When the communication is performed by relaying a plurality of nodes having the bundle communication function unlike the above-mentioned example, it is possible to grasp the communication status effectively by the forwarding notification.

Figure 20:
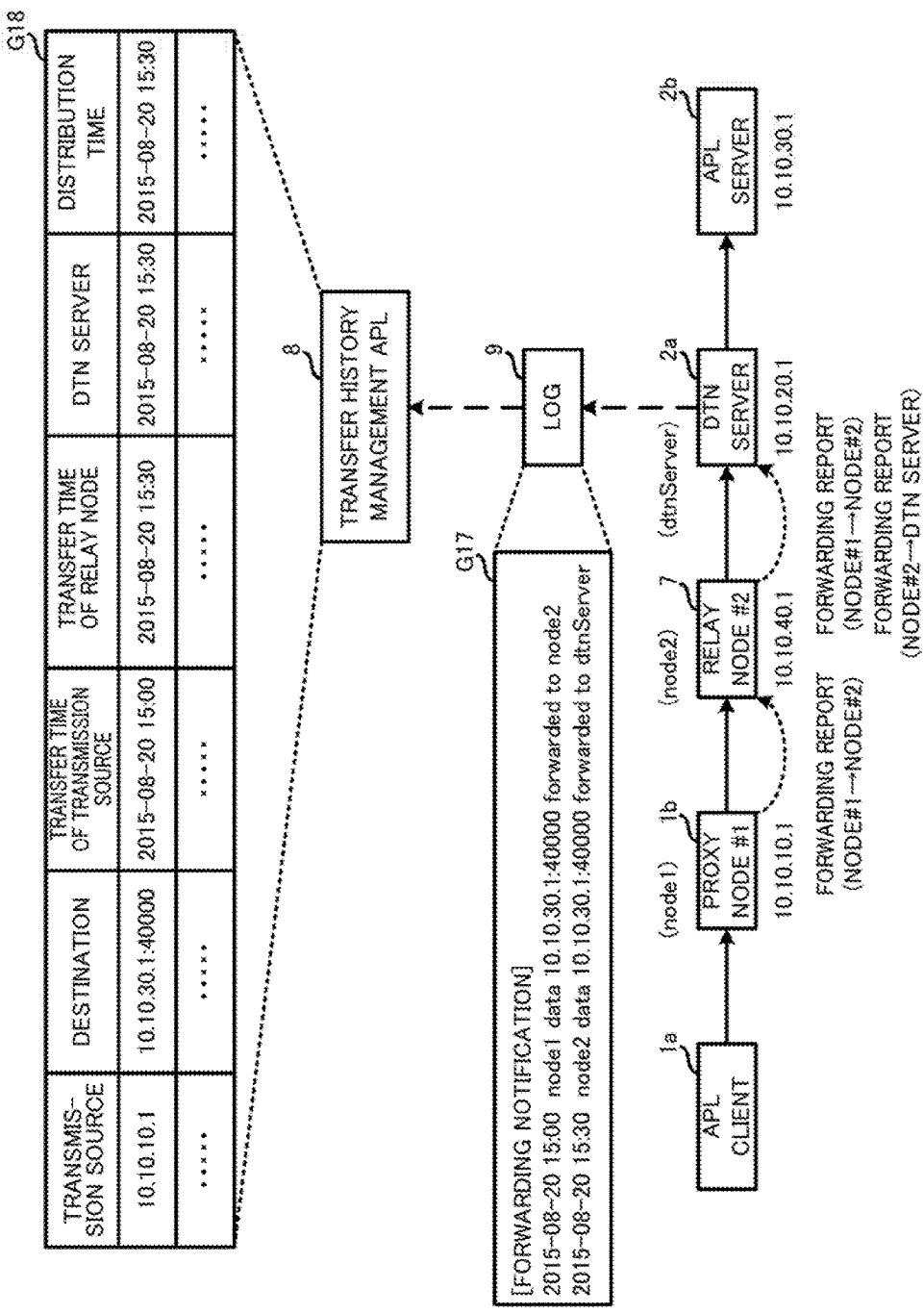
FIG. 20 is a diagram illustrating a use example of a forwarding notification.

FIG. 20 is a diagram illustrating a use example of the forwarding notification. The communication system of this example includes an APL client 1a, a proxy node (#1) 1b, a relay node (#2) 7, the DTN server 2a and the APL server 2b. The APL client 1a, the proxy node (#1) 1b, the relay node (#2) 7, the DTN server 2a and the APL server 2b are connected in this order.

The APL client 1a includes the application function unit 100 from among the terminal 1 of FIG. 3. The proxy node 1b includes other units other than the application function unit 100 from among the terminal 1 of FIG. 3. Each of the APL client 1a and the proxy node 1b has the same configuration as FIG. 1.

Thus, the application function unit 100 of the terminal 1 is implemented in other device, so that other units such as the proxy controlling unit 111 of the terminal 1 can be configured as a communication device independent of the client application 101.

The APL client 1a transmits the APL data to the proxy node 1b having an IP address "10.10.10.1". The proxy node 1b transmits the APL data to the relay node 7 having an IP address "10.10.40.1". The relay node 7 includes a relay function in conformity with RFC5050. The relay node 7 relays the APL data to the DTN server 2a having the IP address "10.10.20.1". The DTN server 2a transmits the APL data to the APL server 2b having the IP address "10.10.30.1".

When the proxy node 1b transfers the APL data to the relay node 7, the proxy node 1b transmits to the relay node 7 the forwarding report indicative of having forwarded the APL data from the node #1 to the node #2. Moreover, when the relay node 7 relays the APL data to the DTN server 2a, the relay node 7 transmits to the DTN server 2a the forwarding report of the proxy node 1b and the forwarding report indicative of having forwarded the APL data from the node #2 to the DTN server 2a.

The DTN server 2a records the forwarding reports collected in this way on a log 9 as the forwarding notification, as illustrated by a code G17. The transfer completion notification includes date and time of the transfer, the nodes (the nodes 1 and 2) of the transfer destinations, the IP address and the port number of the communication destination, and so on.

Moreover, a transfer history management application (transfer history management APL) 8 is implemented in the DTN server 2a, and the transfer history management APL 8 can manage a transfer history based on the log 9 as illustrated by a code G18. The IP addresses of the transmission source and the destination, the transfer time of the transmission source, the transfer time of the relay node 7, the distribution time to the DTN server 2a and so on are recorded in the transfer history as an example.

For example, such a communication system is applied to a case where a vehicle perambulates and collects information for environmental monitoring from a plurality of sensor devices installed extensively. In this case, the APL client 1a installed in the vehicle collects measurement data from each sensor device of each place and transfers the measurement data to the APL server 2b. At this time, a system administrator can grasp the process of the data relay by referring to the log 9 and the transfer history of the DTN server 2a.

(Communication Operation Example 2)

Figure 22:
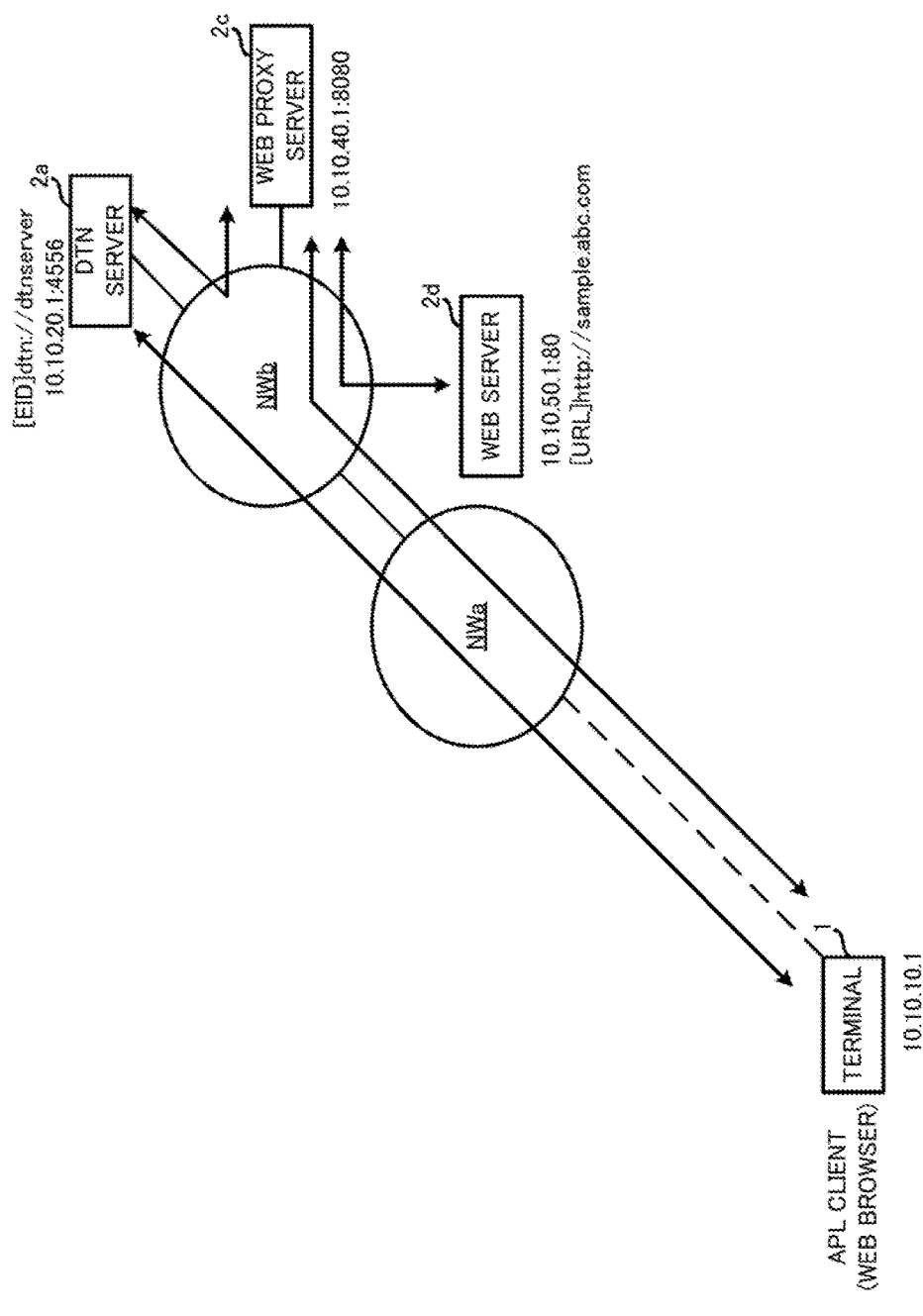
FIG. 22 is a diagram illustrating the communication operation example 2.

FIGS. 21A and 21C illustrate the initial setting files 117 and 217 of a communication operation example 2, respectively. FIGS. 21B and 21D illustrate the route TBLs 123 and 223 of the communication operation example 2. FIG. 22 illustrates the communication operation example 2. In FIG. 22, elements identical to those of FIG. 15 are designated by identical reference numerals, and a description thereof is omitted.

The DTN server 2a, a web proxy server 2c, and a web server 2d are connected to an internet NWb. The terminal 1 functions as the APL client of the web browser, and accesses the web server 2d through the web proxy server 2c.

By the initial setting file 117, an EID "dtn://node1/web" is set to the terminal 1, and an IP address "10.10.40.1" and a port number "8080" of the web proxy server 2c are set as the communication destination of the client application 101, as illustrated in FIG. 21. Moreover, a destination EID "dtn://dtnserver/web", an destination IP address "10.10.20.1" and a port number "4556" of the DTN server 2a are set to the terminal 1 based on the route TBL 123.

By the initial setting file 217, an EID "dtn://dtnserver/ web" is set to the DTN server 2a, and an IP address "10.10.40.1" and a port number "8080" of the web proxy server 2c are set to the DTN server 2a. Moreover, a destination EID "dtn://node1/web", a destination IP address "10.10.10.1" and a port number "4556" of the terminal 1 are set to the DTN server 2a based on the route TBL 223.

First, a description will be given of the communication operation when the connection between the terminal 1 and the access network NWa is established. The web browser of the terminal 1 requests an access to a URL (Uniform resource Locator) "http://sample.abc.com", a request message of a HTTP (Hyper Text Transfer Protocol) is transmitted to the web proxy server 2c.

When the web proxy server 2c receives the request message and there is no cache data of the above URL, the web proxy server 2c searching the cache data of the above URL searches "sample.abc.com" which is a FQDN (Fully Qualified Domain Name) of the URL by using a DNS (Domain Name System), and specifies an IP address "10.10.50.1" of the corresponding web server 2d. The web proxy server 2c transmits the request message of the HTTP into which a port number "80" of the TCP is set, to the web server 2d.

Figure 23A:
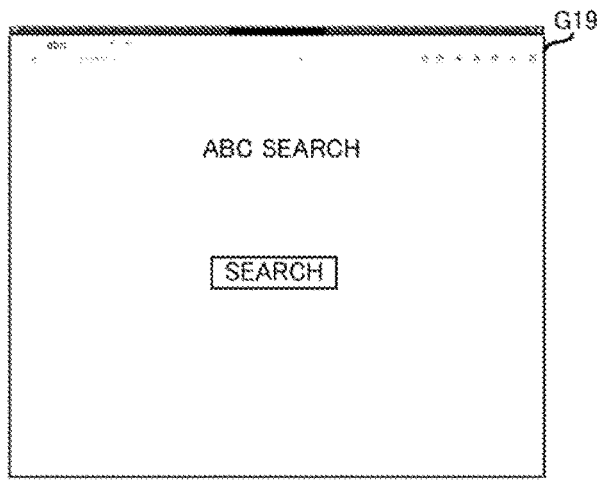
FIGS. 23A to 23C are diagrams illustrating examples of a screen of a web browser.

The web server 2d transmits information to be displayed on the web browser to the web proxy server 2c as a response message to the request message. The web proxy server 2c transfers the response message to the terminal 1. Thereby, a screen as illustrated by a code G19 of FIG. 23A, for example, is displayed on the web browser of the terminal 1.

Figure 23B:

Next, a description will be given of the communication operation when the connection between the terminal 1 and the access network NWa is disconnected. Since the connection is disconnected in the terminal 1, even when the web browser transmits the request message of the HTTP corresponding to the above URL, the request message is not received by the web proxy server 2c. For this reason, if the bundle protocol is not applied to the communication of the client application 101 of the terminal 1, a message indicating an unconnectable condition as illustrated by a code G20 of FIG. 23B, for example, is displayed on the web browser.

Figure 23C:
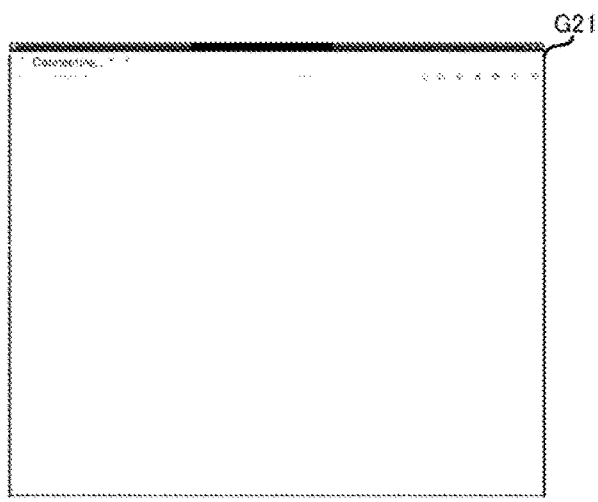

On the contrary, when the bundle protocol is applied to the communication of the client application 101 of the terminal 1, the request message is received by the proxy protocol function unit 110 via the address conversion unit 113. For this reason, a condition during the communication request is continuously displayed as illustrated by a code G21 of FIG. 23C, for example.

Next, a description will be given of the communication operation when the connection between the terminal 1 and the access network NWa is reestablished. When the connection with the access network NWa is reestablished, the bundle controlling unit 120 reads the bundle into which the request message is accommodated, and transmits the bundle to the DTN server 2a. The DTN server 2a transfers the request message to the web proxy server 2c. Moreover, the web proxy server 2c transfers the request message to the web server 2d.

The web server 2d transmits the response message to the DTN server 2a via the web proxy server 2c in response to the request message. In the DTN server 2a, the response message is received by the socket of the transmission and reception controlling unit 214. The proxy controlling unit 211 searches the connection number and the destination EID from the connection list 216 based on the socket channel ID of the socket. The proxy controlling unit 211 generates the proxy message based on a result of the search, and requests the bundle controlling unit 220 to transmit the bundle. The bundle controlling unit 220 transmits the bundle to the terminal 1 based on the bundle protocol.

In the terminal 1, the bundle controlling unit 120 receives the bundle of the response message, and outputs it to the proxy controlling unit 111 as the proxy message. The proxy controlling unit 111 acquires the connection number of the proxy message, and uses the connection number for the search of the connection list 116 along with the destination EID acquired from the bundle controlling unit 120. Thereby, the proxy controlling unit 111 searches a corresponding socket channel and transmits the response message to the socket.

The web browser acquires the response message from the socket. This communication operation is continued until a screen illustrated by a code G19 of FIG. 23 is displayed on the web browser. When the web browser requests a new connection during the communication operation, the proxy controlling unit 111 registers a new connection number into the connection list 116, and the same communication as the above is performed.

By such communication operation, the user can continue the communication condition without reloading the web browser in the terminal 1 and can display a web page on the web browser even when the communication environment is bad. When the connection is disconnected during the communication based on the bundle protocol, even if the display of the web page is any stage, it is possible to continue the communication at the time of the reconnection of the connection.

The above-mentioned processing functions can be realized by a computer. In this case, a program in which the processing contents of the functions which the computer should include is written is provided. By executing the program on the computer, the processing functions are realized by the computer. The program in which the processing contents are written may be recorded on a non-transitory computer-readable recording medium (however, a carrier wave is excluded).

When the program is distributed, a removable recording medium such as a DVD (Digital Versatile Disc) or a CD-ROM (Compact Disc Read Only Memory) in which the program is recorded is sold. Further, the program may be stored in a memory device of a server computer and transferred from the server computer to another computer via a network.

The computer which runs the program, e.g., stores the program recorded in the removable recording medium or transferred from the server computer into a memory device of the computer. Then the computer reads the program from the memory device of the computer, and runs the process according to the program. Incidentally, the computer may read the program directly from the removable recording medium and run the process according to the program. Further, every time the program is transferred from the server computer, the computer may successively run the process according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer readable recording medium storing therein a communication program, the communication program relaying communication from an application operating on a terminal to a communication destination and causing a computer to execute a process, the process comprising:

switching a communication protocol for the communication from a first protocol to a Delay/Disruption Tolerant Networking (DTN) protocol in accordance with a connection condition with the communication destination for the communication;

detecting whether a notification of a completion of a specific communication is necessary for the application to continue the communication, transmitting the notification to the application when the notification is detected as necessary in the detecting; and notifying the terminal of a failure of the specific communication in cases when the notification has been transmitted to the application and the specific communication in the DTN protocol results in failure.

2. The non-transitory computer readable recording medium as claimed in claim 1, the process further comprising:

measuring a communication quality of each of a plurality of communication lines between the communication destination and the terminal;

selecting at least one communication line from the plurality of communication lines based on the communication quality; and performing the specific communication according to the DTN protocol via the selected at least one communication line.

3. The non-transitory computer readable recording medium as claimed in claim 2, the process further comprising:

dividing a predetermined head portion of data to be transmitted from the application to the communication destination into a plurality of blocks;

measuring the communication quality of each of the plurality of communication lines by transmitting the plurality of blocks to the communication destination via the respective communication lines;

selecting the at least one communication line from the plurality of communication lines based on the communication quality; and transmitting another portion of the data to the communication destination via the selected at least one communication line.

4. A communication method implemented by a computer, for relaying communication from an application operating on a terminal to a communication destination, the method comprising:

switching a communication protocol for the communication from a first protocol to a Delay/Disruption Tolerant Networking (DTN) protocol in accordance with a connection condition with the communication destination for the communication;

detecting whether a notification of a completion of a specific communication is necessary for the application to continue the communication, transmitting the notification to the application when the notification is detected as necessary in the detecting; and notifying the terminal of a failure of the specific communication in cases when the notification has been transmitted to the application and the specific communication in the DTN protocol results in failure.

5. The communication method as claimed in claim 4, the method further comprising:

measuring a communication quality of each of a plurality of communication lines between the communication destination and the terminal;

selecting at least one communication line from the plurality of communication lines based on the communication quality; and performing the specific communication according to the DTN protocol via the selected at least one communication line.

6. The communication method as claimed in claim 5, the process further comprising:

dividing a predetermined head portion of data to be transmitted from the application to the communication destination into a plurality of blocks;

measuring the communication quality of each of the plurality of communication lines by transmitting the plurality of blocks to the communication destination via the respective communication lines;

selecting the at least one communication line from the plurality of communication lines based on the communication quality; and transmitting another portion of the data to the communication destination via the selected at least one communication line.

7. A communication device that relays communication from an application operating on a terminal to a communication destination, the communication device comprising:

a memory; and a processor that is coupled to the memory and executes:

switching a communication protocol for the communication from a first protocol to a Delay/Disruption Tolerant Networking (DTN) protocol in accordance with a connection condition with the communication destination for the communication;

detecting whether a notification of a completion of a specific communication is necessary for the application to continue the communication, transmitting the notification to the application when the notification is detected as necessary in the detecting, and notifying the terminal of a failure of the specific communication in cases when the notification has been transmitted to the application and the specific communication in the DTN protocol results in failure.

8. The communication device as claimed in claim 7, further comprising:

a communicator that communicates with the communication destination by the protocol of the DTN;

wherein the communicator measures a communication quality of each of a plurality of communication lines between the communication destination and the terminal, selects at least one communication line from the plurality of communication lines based on the communication quality, and performs the specific communication according to the DTN protocol via the selected at least one communication line.

9. The communication device as claimed in claim 8, wherein the communicator divides a predetermined head portion of data to be transmitted from the application to the communication destination into a plurality of blocks, measures the communication quality of each of the plurality of communication lines by transmitting the plurality of blocks to the communication destination via the respective communication lines, selects the at least one communication line from the plurality of communication lines based on the communication quality; and transmits another portion of the data to the communication destination via the selected at least one communication line.

* * * * *